(12) United States Patent  
Belcher et al.

(10) Patent No.: US 10,442,982 B2  
(45) Date of Patent: Oct. 15, 2019

(54) MULTIFUNCTIONAL PARTICLES FOR ENHANCED OIL RECOVERY

(71) Applicant: MASSACHUSETTS INSTITUTE OF TECHNOLOGY, Cambridge, MA (US)

(72) Inventors: Angela M. Belcher, Lexington, MA (US); Nurxat Nuraje, Brooklyn, NY (US); Yu Lei, Waltham, MA (US); Hiroshi Atsumi, Arlington, MA (US); Xunpei Liu, Quincy, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 122 days.

(21) Appl. No.: 15/160,744

(22) Filed: May 20, 2016

(65) Prior Publication Data

US 2016/0340569 A1 Nov. 24, 2016

Related U.S. Application Data

(60) Provisional application No. 62/164,652, filed on May 21, 2015.

(51) Int. Cl.
| | |
|---|---|
| *C09K 8/584* | (2006.01) |
| *E21B 43/10* | (2006.01) |
| *E21B 47/06* | (2012.01) |
| *E21B 43/16* | (2006.01) |

(52) U.S. Cl.
CPC .......... *C09K 8/584* (2013.01); *C09K 2208/10* (2013.01)

(58) Field of Classification Search
None
See application file for complete search history.

(56) References Cited

U.S. PATENT DOCUMENTS

| | | |
|---|---|---|
| 2003/0220204 A1 | 11/2003 | Baran, Jr. et al. |
| 2005/0169348 A1 | 8/2005 | Chen et al. |
| 2008/0190814 A1* | 8/2008 | Caneba .............. C09K 3/32 208/390 |
| 2009/0178921 A1 | 7/2009 | Lawrence et al. |
| 2010/0196482 A1 | 8/2010 | Radovic-Moreno et al. |
| 2011/0214862 A1* | 9/2011 | Horton ................ C09K 8/03 166/283 |
| 2012/0258452 A1 | 10/2012 | Krishnan et al. |
| 2013/0091941 A1* | 4/2013 | Huh ................ E21B 47/1015 73/152.08 |

(Continued)

FOREIGN PATENT DOCUMENTS

| | | | |
|---|---|---|---|
| GB | 2490207 A | * 10/2012 | ........... C12Q 1/68 |
| WO | 2014/123672 A1 | 8/2014 | |

OTHER PUBLICATIONS

Notification of Transmittal of The International Search Report and The Written Opinion of the International Searching Authority, or The Declaration dated Sep. 9, 2016, issued in International Application No. PCT/US2016/033537.

(Continued)

*Primary Examiner* — John J Figueroa  
(74) *Attorney, Agent, or Firm* — Steptoe & Johnson LLP

(57) ABSTRACT

To deliver surfactants or tracers to underground oil fields, inorganic encapsulated surfactant nanoparticles or microparticles that are stable for several weeks under high temperature and high salt conditions can be used.

19 Claims, 43 Drawing Sheets

Specification includes a Sequence Listing.

(56) References Cited

U.S. PATENT DOCUMENTS

| | | | |
|---|---|---|---|
| 2013/0123149 A1 | 5/2013 | Berkland et al. | |
| 2014/0220563 A1* | 8/2014 | McCann | C12Q 1/68 435/6.11 |
| 2014/0271889 A1 | 9/2014 | Messersmith et al. | |
| 2016/0075941 A1* | 3/2016 | Duenckel | C09K 8/805 166/280.2 |
| 2016/0186044 A1* | 6/2016 | Rothrock | C09K 8/58 166/300 |

OTHER PUBLICATIONS

The International Search Report dated Sep. 9, 2016, issued in International Application No. PCT/US2016/033537.

Written Opinion of the International Searching Authority dated Sep. 9, 2016, issued in International Application No. PCT/US2016/033537.

\* cited by examiner

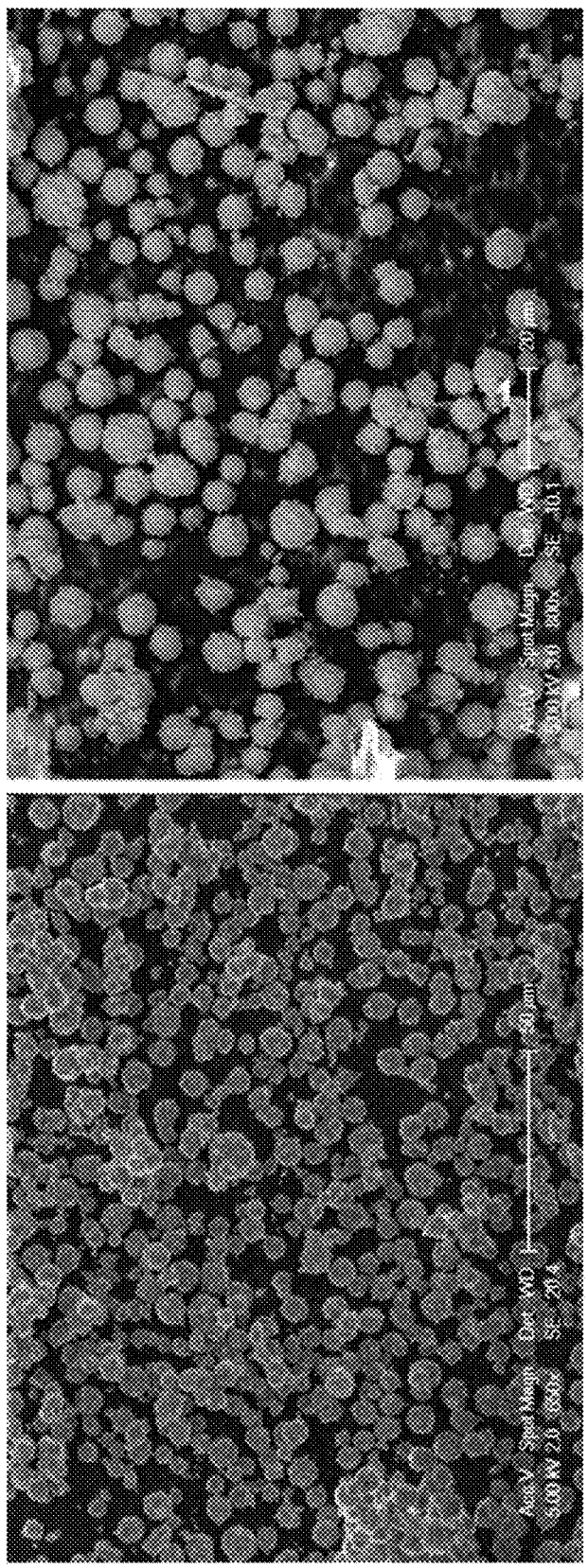
FIG. 11B  CaCO₃ + SDS with Fe₃O₄ + DNA
FIG. 11A  CaCO₃ + SDS with Fe₃O₄

Magnetic particles

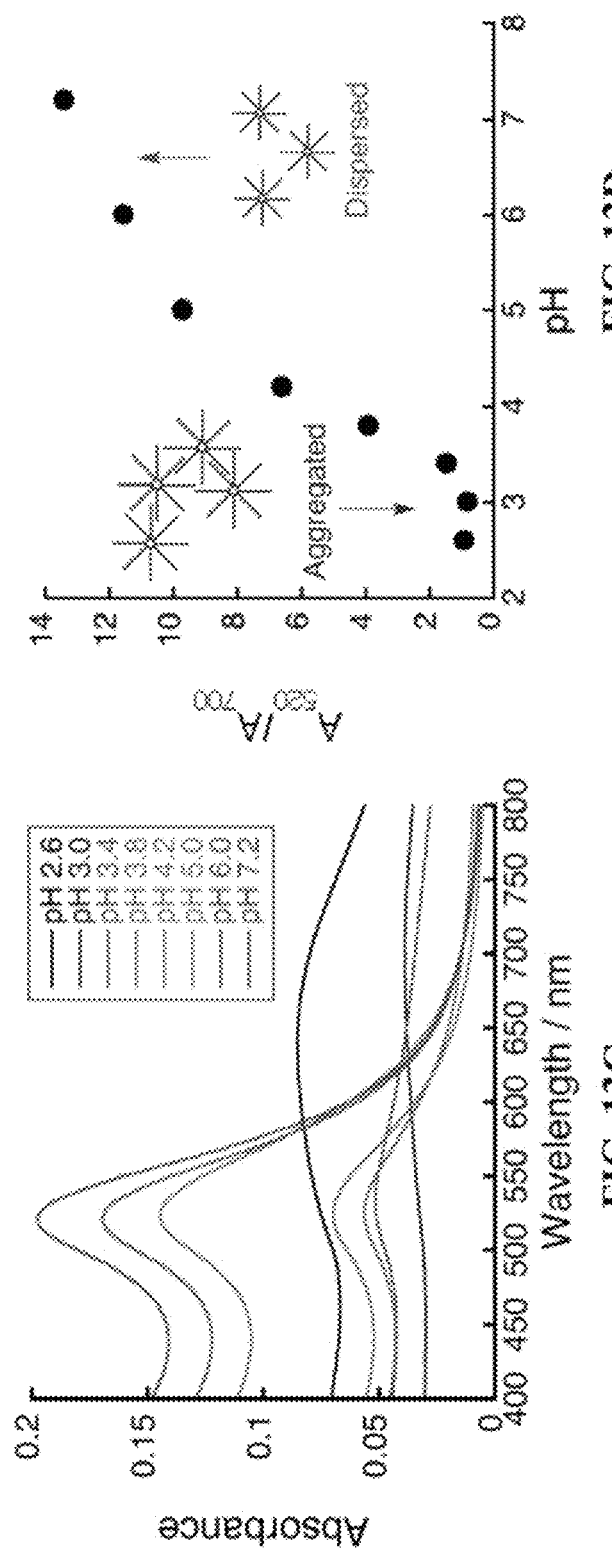

DNA1: TAT CTG TTA CAT TAA CCG CGA CAG GAG ACA GGA AGG CCG TTA ATG TTA CTA CAT
DNA1a: TTG TAT AAA ATG CGC TAG CCT CAT TAG CCT CTC TGT CTC TTA ATG GCG CAT TTT AAG GTT

SEQUENCE LISTING

```
<160> NUMBER OF SEQ ID NOS: 2

<210> SEQ ID NO 1
<211> LENGTH: 60
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
tatctgttac attaaccgcg acaggagaca ggagacaggc cgcggttaat gtaactacat    60

<210> SEQ ID NO 2
<211> LENGTH: 60
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
ttgtataaaa tgcgccatta gcctgtctcc tgtctcctgt taatggcgca ttttaaggtt    60
```

MULTIFUNCTIONAL PARTICLES FOR ENHANCED OIL RECOVERY

CLAIM OF PRIORITY

This application claims the benefit of prior U.S. Provisional Application No. 62/164,652 filed on May 21, 2015, which is incorporated by reference in its entirety.

SEQUENCE LISTING

The instant application contains a Sequence Listing which has been submitted electronically in ASCII format and is hereby incorporated by reference in its entirety. Said ASCII copy, created on Aug. 5, 2016, is named 14952_0519_SL.txt and is 768 bytes in size.

TECHNICAL FIELD

This invention relates to articles, devices, and methods for oil recovery.

BACKGROUND

Improving the efficiency of recovering oil from a source such as an oil well continues to be an industry target to improve economic and environmental impact. The process of enhanced oil recovery (EOR) still remains challenges, because (1) surfactants are needed to deliver for reducing interfacial tension between oil and water and extraction oil in an oil reservoir, (2) there are still unknown information in the underground, such as temperature and pH.

SUMMARY

In general, a composition can include a nanoparticle or microparticle including a core including one or more surfactants and an outer layer encapsulating the core, wherein the outer layer includes an inorganic material.

In certain embodiments, the core can have a micelle structure.

In certain embodiments, the inorganic material can include calcium carbonate or silica.

In certain embodiments, the core can include oleic acid.

In certain embodiments, the one or more surfactants can include an anionic surfactant or a cationic surfactant. In certain embodiments, the anionic surfactant can be sodium dodecyl sulfate (SDS). In certain embodiments, the cationic surfactant can be cetyl trimethylammonium bromide.

In certain embodiments, the core can further include a DNA, for example, double-stranded DNA. In certain embodiments, the DNA can be negatively charged. In certain embodiments, the DNA can form a hairpin structure, an A-motif structure, or an I-motif structure. In certain embodiments, the DNA can include a monomer, a dimer, or a combination thereof.

In certain embodiments, the core can further include a magnetic material. In certain embodiments, the magnetic material can be ferrofluid.

In certain embodiments, the core can include an upconverting nanoparticle.

In certain embodiments, a thickness of the outer layer can be between 10 nm and 20 nm.

In certain embodiments, the surfactant can be released from the outer layer at pH 3.0 or below.

In another aspect, a sensor can include the composition described above.

In another aspect, a sensor carrier can include a core including a magnetic material and an outer layer encapsulating the core, wherein the outer layer including a plurality of the composition described above.

In certain embodiments, the magnetic material can be iron oxide.

In another aspect, a sensor can include the composition described above and a plurality of plasmonic nanoparticles.

In certain embodiments, the sensor can detect a pH change. In certain embodiments, the sensor can detect the pH change in presence of oil. In certain embodiments, the sensor can detect the pH change in an environment where the percentage of oil of between 0 to 80%. In certain embodiments, the sensor can detect a temperature change. In certain embodiments, the sensor can detect an ionization strength.

In certain embodiments, the plasmonic nanoparticles can include gold.

In another aspect, a method of making a composition can include preparing one or more surfactants; forming a core including the one or more surfactants; and encapsulating the core with an inorganic material.

In certain embodiments, the core can have a micelle structure. In certain embodiments, the method can further include a DNA in the core. In certain embodiments, the method can further include including a magnetic material in the core.

In certain embodiments, the method can further include including an additive. In certain embodiments, the additive can be citrate. In certain embodiments, the additive can be a polymer.

In another aspect, a method of increasing a size of the nanoparticle can include lowering an amount of the SDS.

In another aspect, a method of decreasing a size of the nanoparticle can include including a citrate in the composition.

In another aspect, a method of enhanced oil recovery can include delivering to a target region a composition including a nanoparticle or microparticle including a core including a surfactant; and an outer layer encapsulating the core, wherein the outer layer includes an inorganic material; releasing the surfactant from the composition; and collecting the composition.

Other aspects, embodiments, and features will be apparent from the following description, the drawings, and the claims.

BRIEF DESCRIPTION OF THE DRAWINGS

FIG. 11A shows SEM image of $CaCO_3$ particle with $Fe_3O_4$. FIG. 11B shows $CaCO_3$ particles with $Fe_3O_4$ and DNA.

FIGS. 13A-13D show pH sensor based on DNA secondary structure (A-motif) with plasmonics. FIG. 13A shows schematic illustration and chemical structure of A-motif. FIG. 13B shows pH sensor based on A-motif on gold nanoparticle. Lower picture shows color change as a function of pH. FIG. 13C shows absorbance spectra of the pH sensor with different pH. FIG. 13D shows $A_{520}/A_{700}$ analysis of the pH sensor as a function of pH.

FIG. 19A discloses SEQ ID NO: 1.

FIG. 26B discloses SEQ ID NOS 1-2, respectively, in order of appearance.

DETAILED DESCRIPTION

In the process of enhanced oil recovery (EOR), delivery of surfactants to oil wells without any loss is crucial to the improvement of oil production in oil fields since surfactants can reduce interfacial tension between oil and water, and extract oil in oil reserve banks. However, loss of surfactants during EOR such as its adsorption inside oil wells is a major problem. To prevent the loss of surfactants and improve oil recovery efficiency, it is important to efficiently deliver surfactants to oil wells without any loss. In addition, tracing within oil well reservoirs is very important because of the information of geological structure of underground oil well system and tracking chemical additives including EOR chemicals, etc. Therefore, a controlled delivery method is of interest.

Disclosed herein is a method based on biological approaches for delivering surfactants or tracers to underground oil fields using nanoparticles that are stable for several weeks under high temperature and high salt conditions. Both biomimetic approaches mimicking structures such as diatoms and calcium based algae as well as genetic engineering to build high surface area biological sponges to act as surfactants were used. There are many examples in nature of biologically-controlled mineralization, including calcium carbonate in mollusk shells, sea urchin, spicules, coral, avian eggshells, oyster pearls, and coccolithophores, calcium phosphate in skeletal bone, and silica in diatoms. Currently two complimentary approaches are in progress including 1) inorganic encapsulated surfactant nanoparticles and 2) bio-inspired materials as surfactants.

Figure 1:
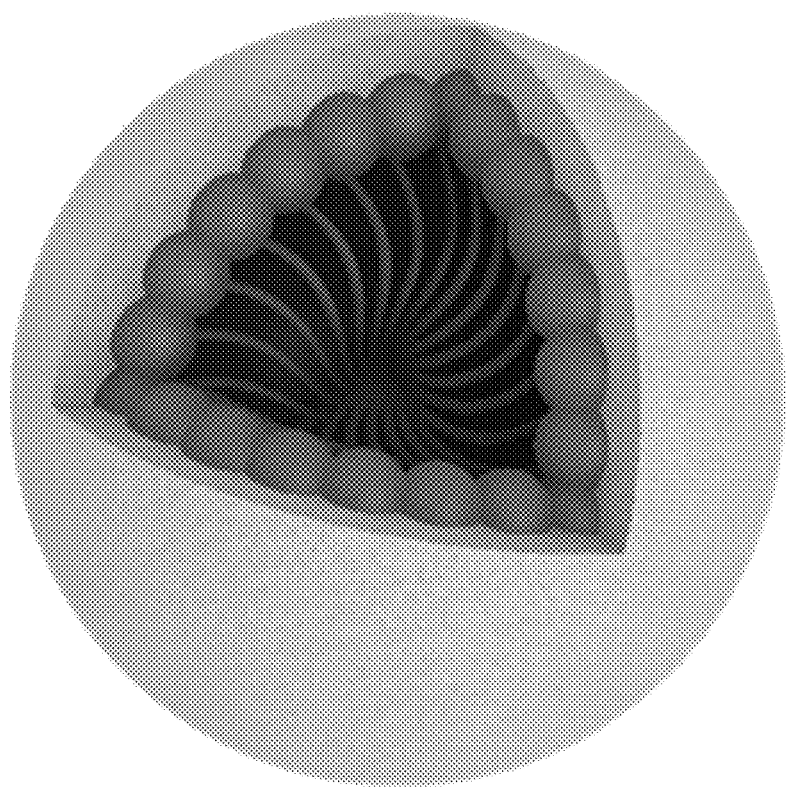
FIG. 1 shows a scheme showing surfactant ant delivery systems. Shell is inorganic nanomaterials.
Figure 6:
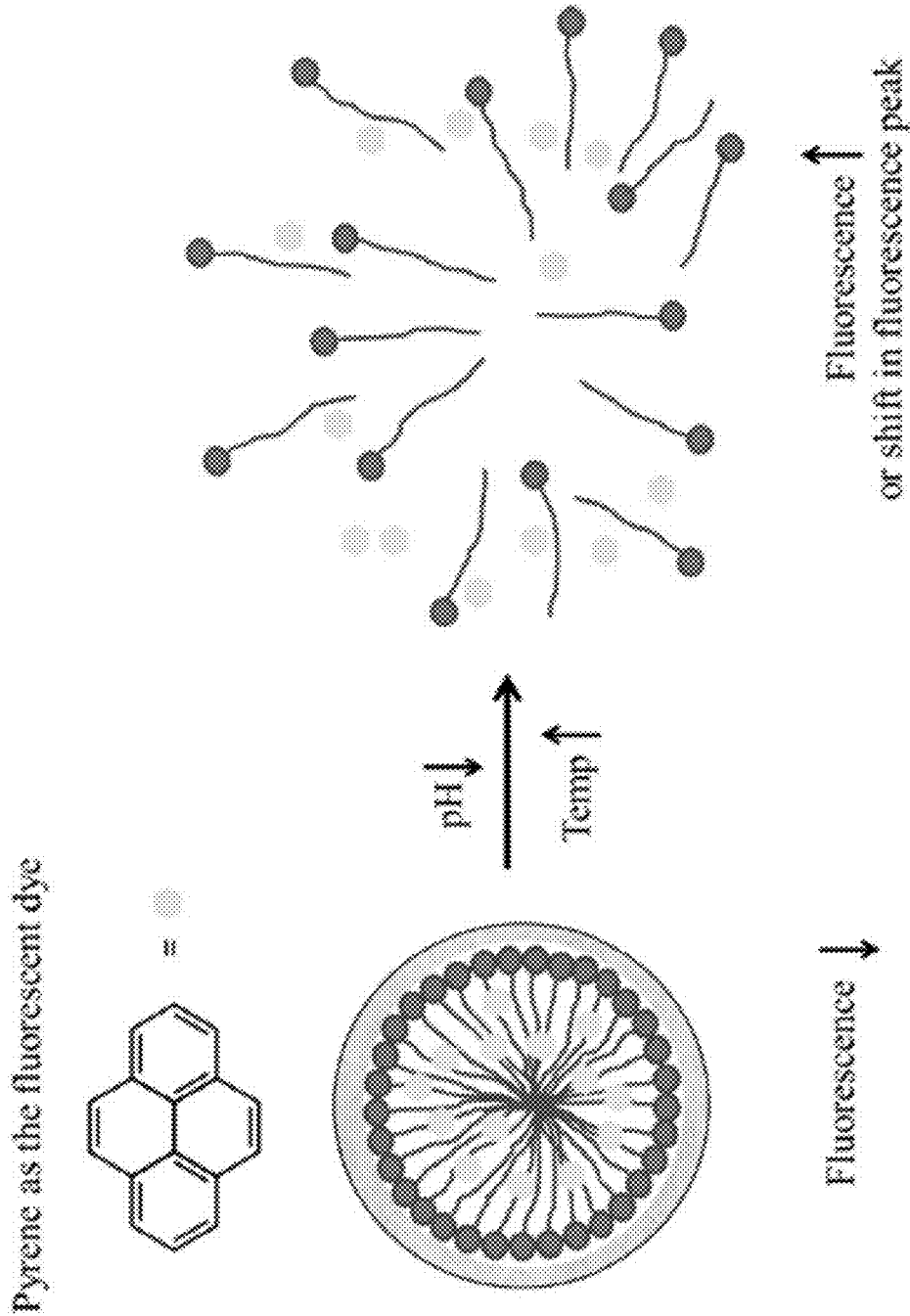
FIG. 6 shows a scheme of release of surfactants through dissolving shells.

Disclosed is a composition including a nanoparticle or microparticle comprising a core including one or more surfactants and an outer layer (i.e. shell) encapsulating the core, where the outer layer includes an inorganic material. The core can have a micelle structure as shown in FIGS. 1 and 6.

The inorganic material of the outer layer can include calcium carbonate, silica calcium phosphate, and other environment friendly and chemically stable materials.

The core can also include oleic acid, alkali, surfactant and polymer.

The surfactants in the core can include an anionic surfactant and cationic surfactants. The anionic surfactant can be sodium dodecyl sulfate (SDS), ammonium lauryl sufate and perfluorooctanesulfonate. The cationic surfactant can be cetyl trimethylammonium bromide (CTAB), cetylpyridinium chloride, and benzalkonium chloride.

The core can also include a DNA. In certain embodiments, the DNA is negatively charged. In certain embodiments, the DNA forms a hairpin structure. In certain embodiments, the DNA includes an A-motif structure and an I-motif structure. In certain embodiments, the DNA includes a monomer, a dimer, or a combination thereof. In certain embodiments, the core further includes a magnetic material. In certain embodiments, the magnetic material can be ferrofluid. In certain embodiments, the core includes an upconverting nanoparticle.

In certain embodiments, such as our silica nanoparticles, the thickness of the outer layer can be less than 100 nm, less than 90 nm, less than 80 nm, less than 70 nm, less than 60 nm, less than 50 nm, less than 40 nm, less than 30 nm, less than 20 nm, or less than 10 nm. In certain embodiments, thickness of the outer layer can be uniform with variation less than 10 nm. Specifically, the thickness of the out layer can be between 10 nm 20 nm. In the calcium carbonate microparticles, the thickness of the out layer could be 100-200 nm.

In certain embodiments, the surfactant in the core can be released from the outer layer at an acidic condition, for example the surfactant will start to release from the calcium carbonate particles when the pH is lower than about pH 3.

In certain embodiments wherein a shape of the composition can be spherical, a core shell structure or a porous structure.

A sensor can include such a composition for detection of various environmental factors, such as pH, temperature, or ionization strength.

The sensor or the composition can be loaded onto a sensor carrier for easy delivery and collection. In certain embodiments, a sensor carrier can include a core including a magnetic material and an outer layer encapsulating the core, wherein the outer layer including a plurality of the composition described herein.

In certain embodiments, a sensor can further the composition described herein and a plurality of plasmonic nanoparticles. For example, the plasmonic nanoparticles can include gold. This sensor can detect a pH change.

In certain embodiments, a sensor can detect the pH change in presence of oil. The sensor can have the same efficacy in various oil-water mixing environments include in 0 to 80% oil presence.

A sensor can include an upconverting nanoparticle in the composition that could apply to the area of EOR imaging or medical imaging.

A size detector can include a tread of various sized $CaCO_3$ containing unique DNA sequences.

A thermal detector can include dimer-monomer DNA nanostructures in the core of the composition, which responds to a specific temperature value.

An ionization sensor can include dimer-monomer DNA nanostructures in the core of the composition, which responds to different salt concentration environments.

A method of making a composition can include preparing one or more surfactants, forming a core including the one or more surfactants; and encapsulating the core with an inorganic material. The method can further including a DNA, magnetic material, an additive (e.g. citrate or polymer), or an upconverting nanoparticle in the core as described herein.

The size of the nanoparticles can be controlled by treating with additive chemicals including polymers and citric acid and provides changing buoyancy property of the particles. For example, the size can be increased by lowering an amount of the SDS and can be decreased by adding citric acid.

A method of enhanced oil recovery can include delivering to a target region the composition described herein, releasing the surfactant from the composition, and collecting the composition.

The composition and method can include calcium carbonate ($CaCO_3$) particles and the sizes of $CaCO_3$ particles can be controlled by changing the SDS concentration or adding citrate additives, and improved the buoyancy of the $CaCO_3$ particles using Synperonic® F108 because $CaCO_3$ particles can have higher density than oil and $CaCO_3$ particles can fall down while traveling with the oil flow. This composition and method can be used for surfactant delivery and DNA sensor delivery (temperature and pH sensor). The DNA sensor can be based on the changes of their nanostructure in respond to the environment changes.

Encapsulation of Surfactants

Figure 2B:
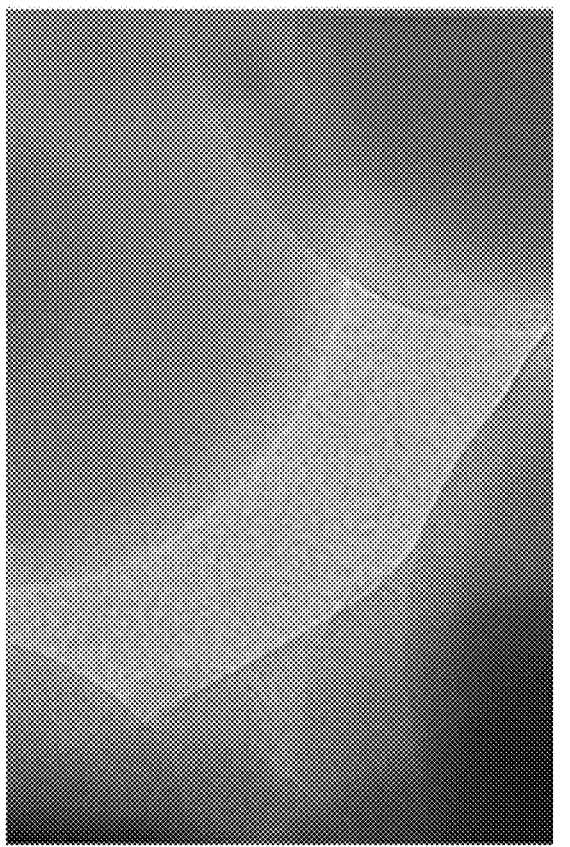
FIGS. 2A-2B show SEM and TEM images of Silica encapsulated CTAB micelle structures.
Figure 2A:
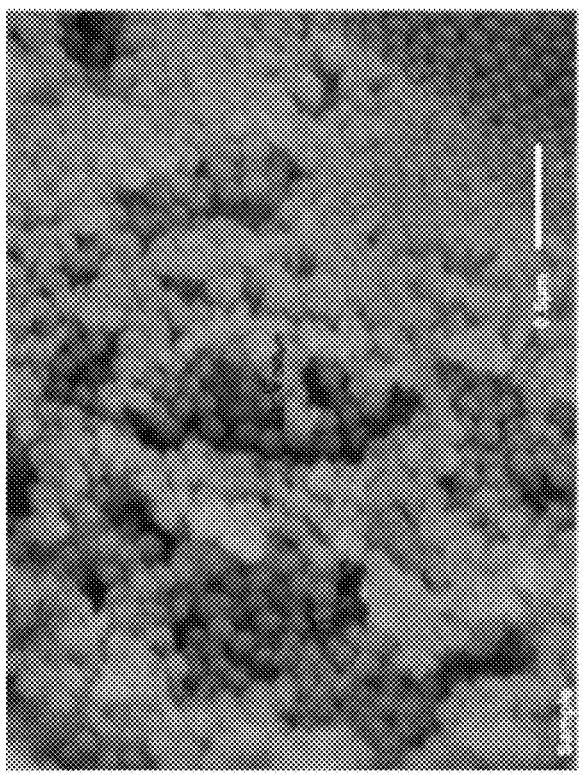
Figure 3B:
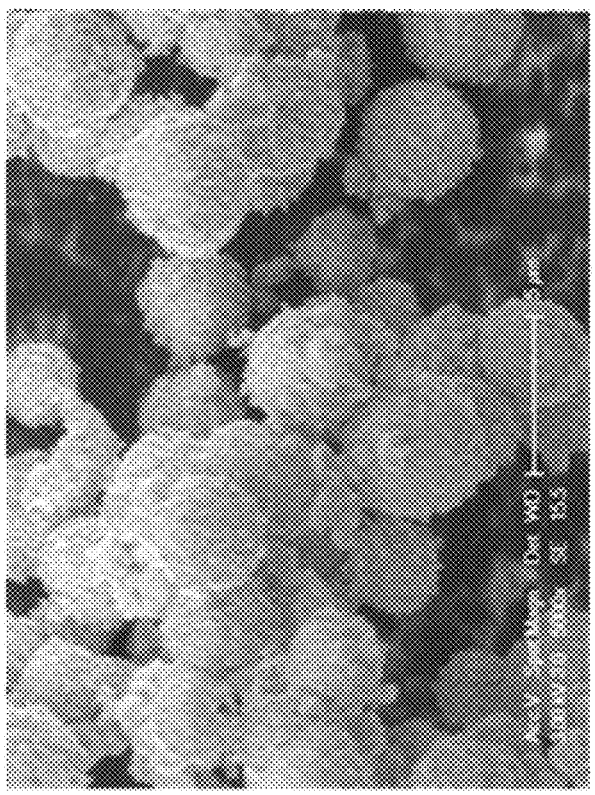
FIGS. 3A-3B show SEM images of calcium carbonate encapsulated SDS micelle structures.
Figure 3A:
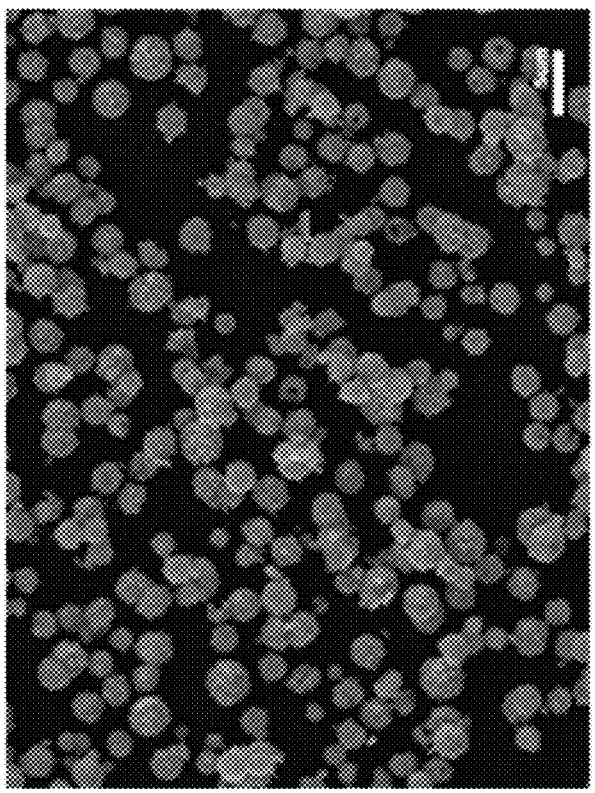
Figure 4:
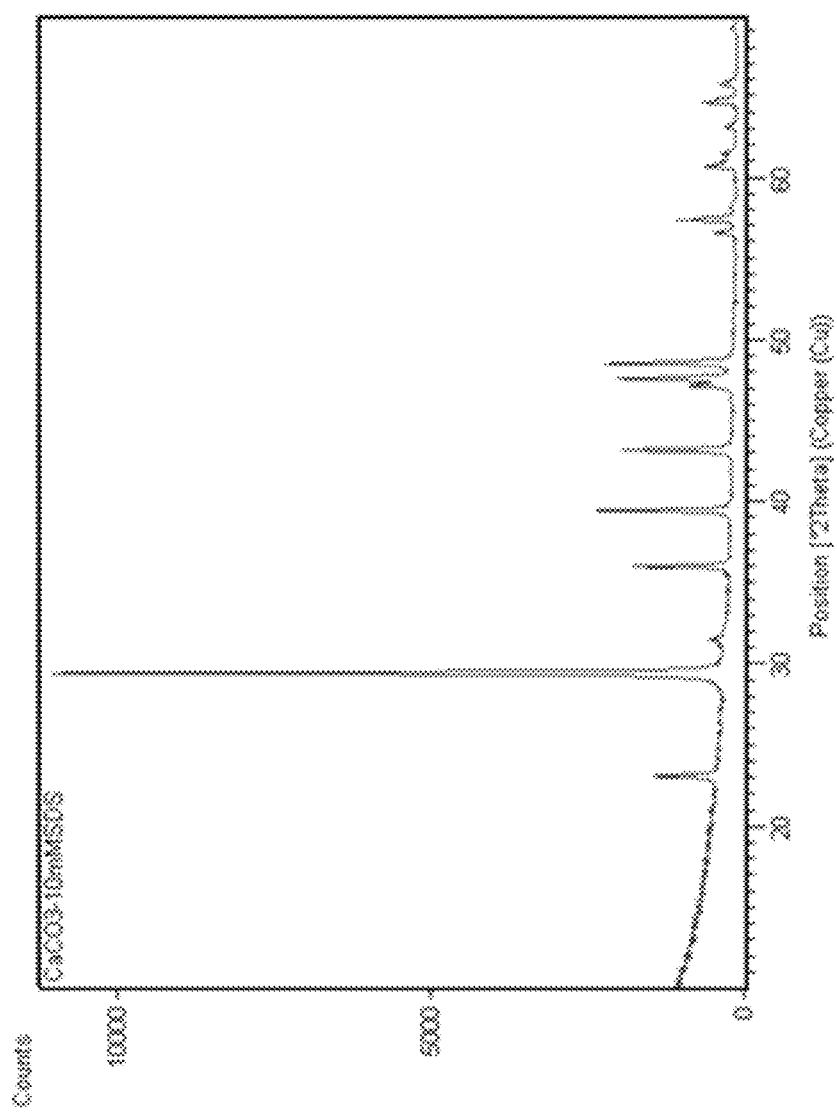
FIG. 4 shows an XRD spectrum showing calcite structure of $CaCO_3$.

To control the release of surfactants in targeted regions of oil wells, different types of shells were designed to be controlled based on required conditions. Silica based on diatoms were chosen to release surfactants based on the diffusion model. Calcium carbonate ($CaCO_3$) is another option for encapsulation of surfactants since it can be dissolved under pH control. Therefore, calcium carbonate encapsulated particles could be used to deliver the surfactant to a target, and in the presence of an acid can be triggered to release the surfactant. To design the inorganic encapsulated delivery system, the following representatives for anionic and cationic surfactants that can be encapsulated into nanoparticles (less than or equal to 1 um diameter) are oleic acid (OA), sodium dodecyl sulfate (SDS), and cetyl trimethylammonium bromide (CTAB). Surfactants including CTAB, SDS, and oleic acid can be encapsulated into nanoparticles (FIG. 1). The core is aggregation of surfactants. The delivery system was designed as a core-shell structure of nanoparticles (FIG. 1). During the initial phase, the controlled synthesis of a surfactant template and encapsulated silica nanosphere was successful. By tailoring the size, a library of particles was built to be used for releasing surfactants at different depths. By controlling the thickness of the shell, the conditions of release were controlled. From the high-resolution TEM images (FIG. 2B), the diameters of nano-sized particles in the range of 70 nm-130 nm were consistently synthesized. The formation of core-shells are shown from each nanoparticle (FIG. 2A). Shell thickness from each particle was measured and indicates a range of 10-20 nm, which is uniform and becomes advantageous to the stage of surfactant release. Calcium carbonate was also applied to create shell for SDS delivery system (FIGS. 3A and 3B). In this design, micelle structures of surfactants were used as templates for the growth of shell materials which consist of calcium carbonate. XRD results (FIG. 4) showed $CaCO_3$ shell has a calcite structure.

Figures 5A, 5B:
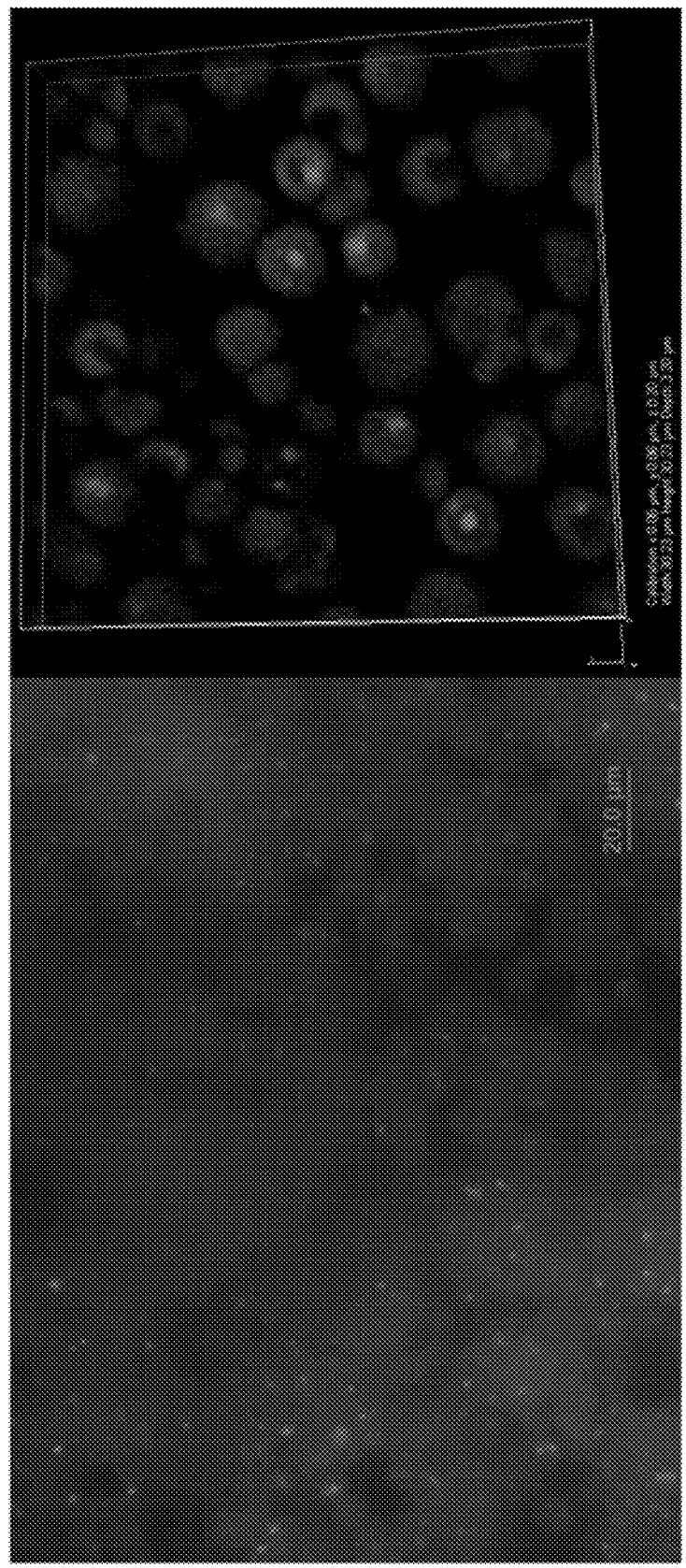
FIG. 5A shows fluoresce microscope image of pyrene encapsulated $CaCO_3$ particles.
FIG. 5B shows confocal fluoresce microscope image of the particles.

To prove the SDS is encapsulated by $CaCO_3$, a fluorescent pyrene experiment was designed. In this experiment, pyrene was dissolved in a 10 mM SDS solution. The appropriate amounts of precursors of $CaCl_2$ and $Na_2CO_3$ were added to the pyrene dissolved SDS solution. After the reaction, the solution mixtures were filtrated and washed with the pure water. The dried precipitates were confirmed by confocal fluorescence microscopy. Both illustrations from FIGS. 5A and 5B indicate the evidence of pyrene in the middle of the particles.

Triggered Release of Surfactants

Figure 7:
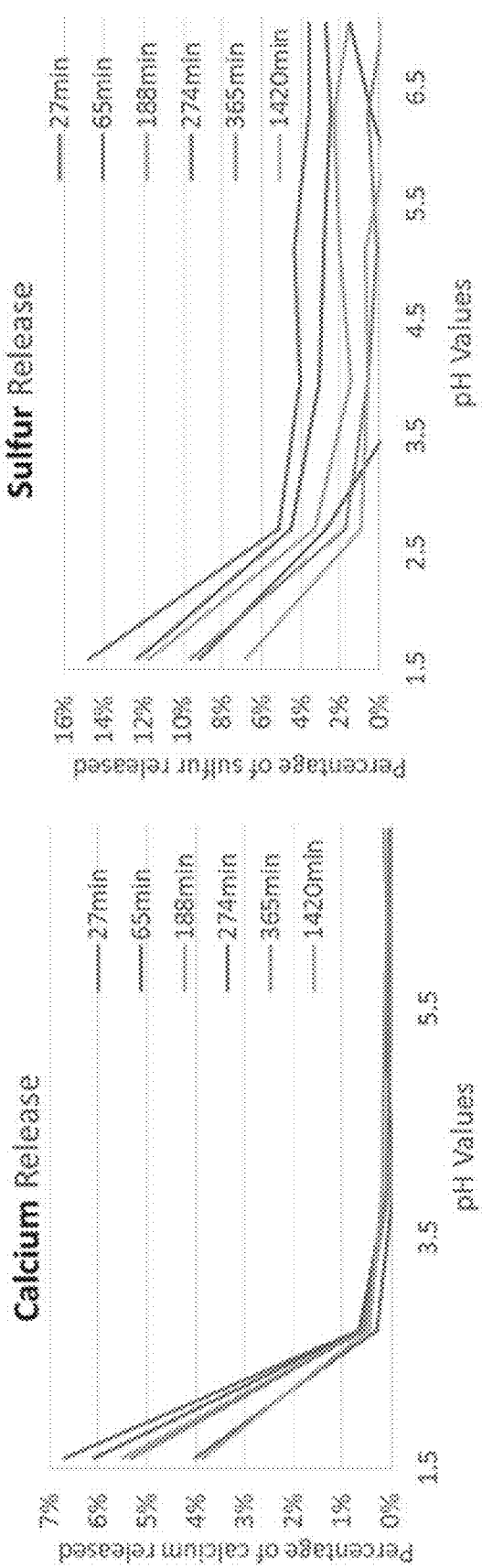
FIG. 7 shows calculated concentrations of calcium and sulfur at different pHs.

To release surfactants from carriers, calcium carbonate hollow spherical particles were used in this experiment (FIG. 6) since calcium carbonate is soluble in acidic condition. The concentration of microsized particles were quantified by a Multisizer Tester (Beckman Coulter). Inducing coupling plasma elemental analysis technique (ICP) was applied to measure the concentration of sulfur and calcium. The pH range from 1.5 to 6.5 was applied to investigate their release profile as shown in FIG. 7. The results indicated that both concentrations of calcium and sulfur elements in the supernatant of the solution were high for the pH below 3 in comparison to the pH higher than 3. Furthermore, it was confirmed the calcium carbonate shell started to dissolve when the pH is lower than 3.

Designs of EOR Tracers

Figure 8:
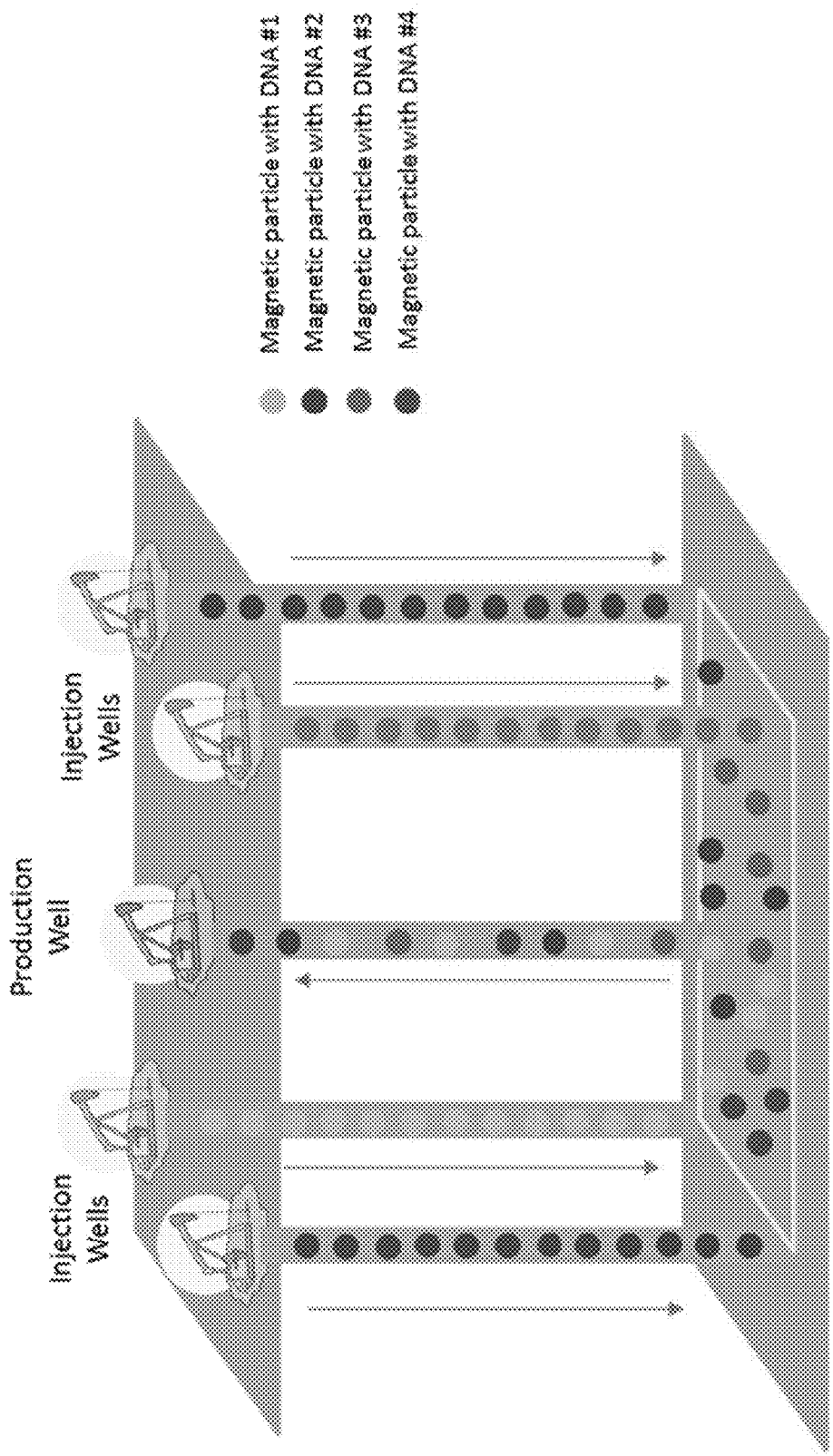
FIG. 8 shows a scheme of different sequenced DNA encapsulated particles movement with different time and geographical pathways.

DNA-label $CaCO_3$ particles as tracers were designed and utilized to detect where and when the particles have been injected. The ferrofluid is encapsulated in addition to DNA in the particles to simplify the particle collection processes. The goal of this work is to probe the structure of underground oil well systems and trace the external additives and their performances (FIG. 8).

Figure 9:
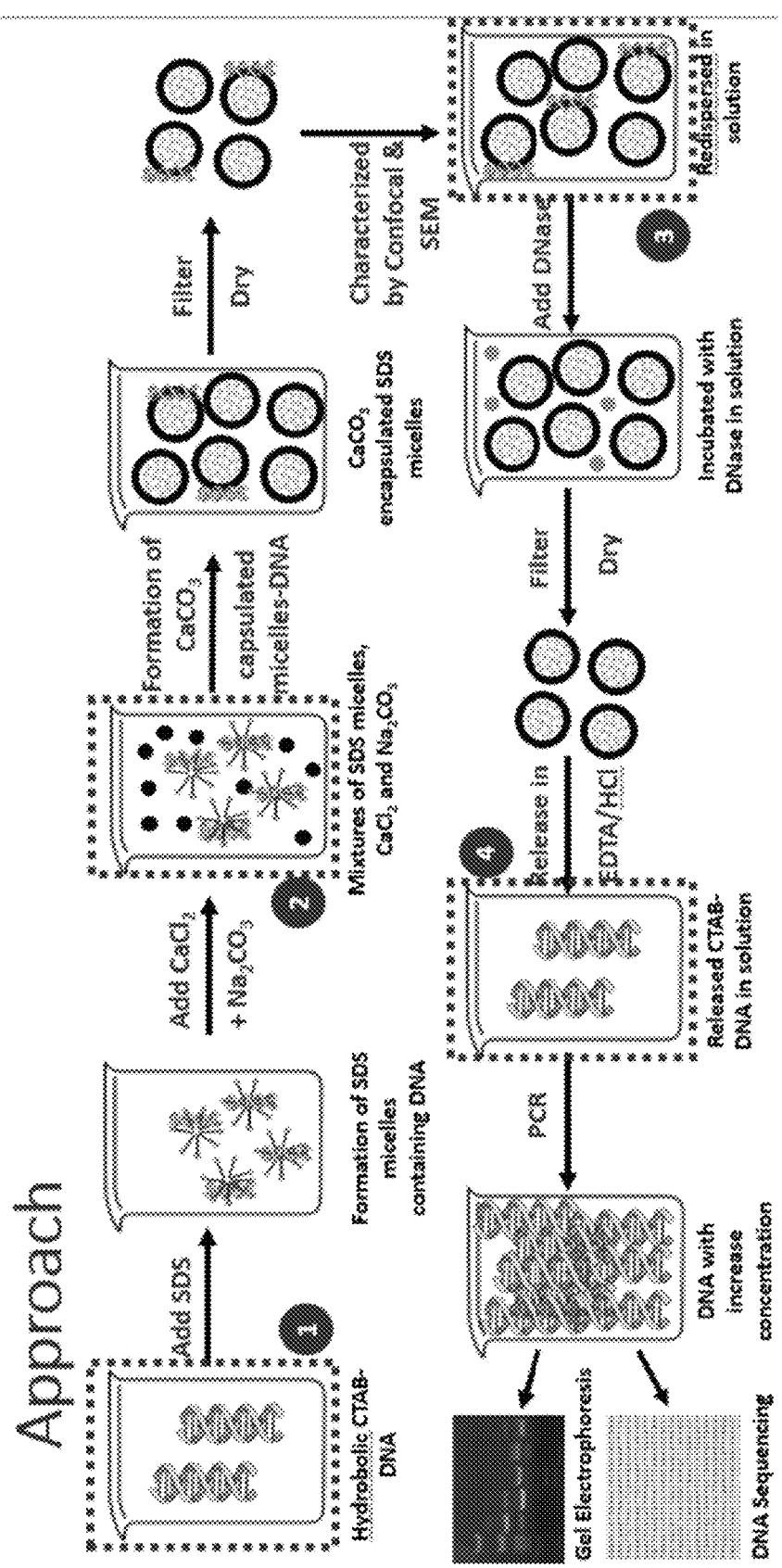
FIG. 9 shows a new approach to make $CaCO_3$ encapsulated DNA nanoparticles.

The grant approach is proposed in the following diagram in FIG. 9. Various types of DNAs are encapsulated by calcium carbonate shells or other shells first. Then DNA-label particles will be applied to trace from injection well to production wells. The magnetic nanoparticles inside the particles will be helpful to separate themselves from oil during collection stage. The isolated DNAs or encapsulated DNAs in the porous hollow particles are further amplified and identified through PCR reactions and gel electrophorese.

Figure 10A:
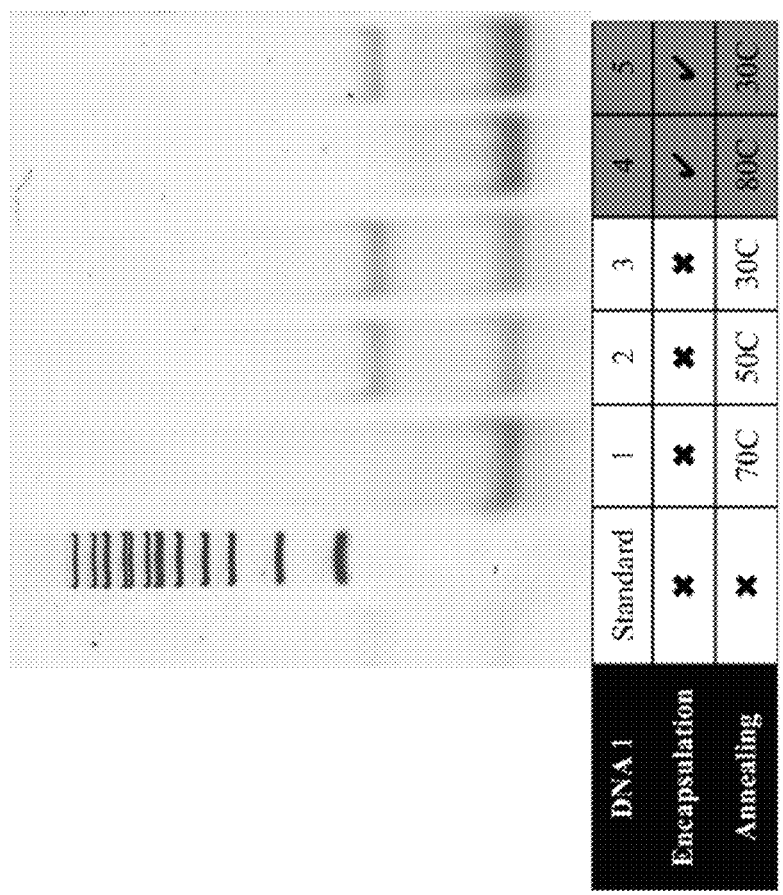
FIG. 10A shows a gel electrophoresis on released DNA solution after PCR.
Figure 10B:
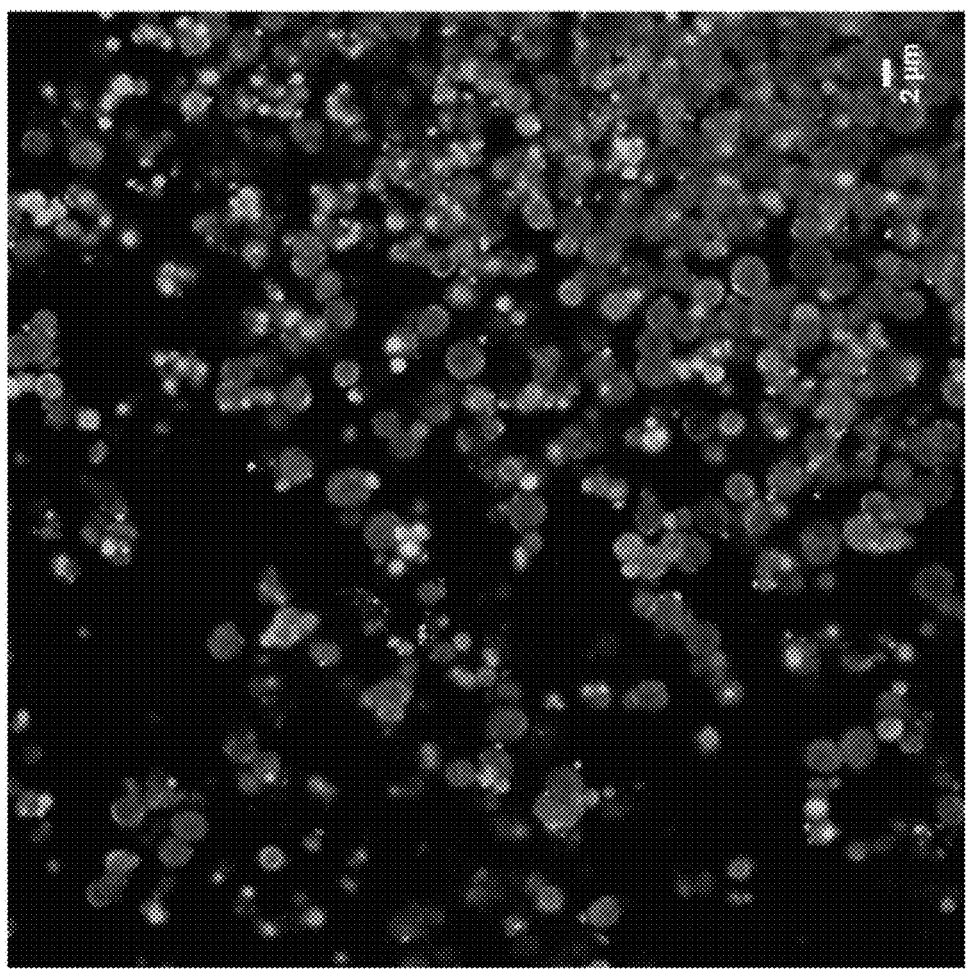
FIG. 10B shows confocal image on DNA particles after DNase treatment. Green color indicates the calcium labeled by calcein, and red color indicates the cy5 dye modified onto the DNA.

Inorganic microparticles containing various DNA segments were designed to be tracers that are used to identify the oilfield's underground tunnel formations. Hence, nanoparticles encapsulating DNA inside were made. $CaCO_3$ encapsulated DNA nanoparticles were designed based on the steps indicated below (FIG. 9). In order to prove the existence of DNA inside of particles after the synthesis, confocal imaging was done on the fluorescence-label DNA particles, and the positive evidences of DNA that is inside of the particles were observed (FIG. 10B). In the next step, the DNA was released from the particles to the solution, and again the evidences of the DNA were found in the solution. Due to the low concentration of DNA, the method of PCR was taken to amplify the DNA population and the gel electrophoresis was used to identify the size of DNAs. In the gel electrophoresis result (FIG. 10A), it was confirmed the released particles in solution contained the same DNA that was initially encapsulated into the particle. Hence, it proved that encapsulating DNA into the inorganic particles was successful.

Figure 11D:
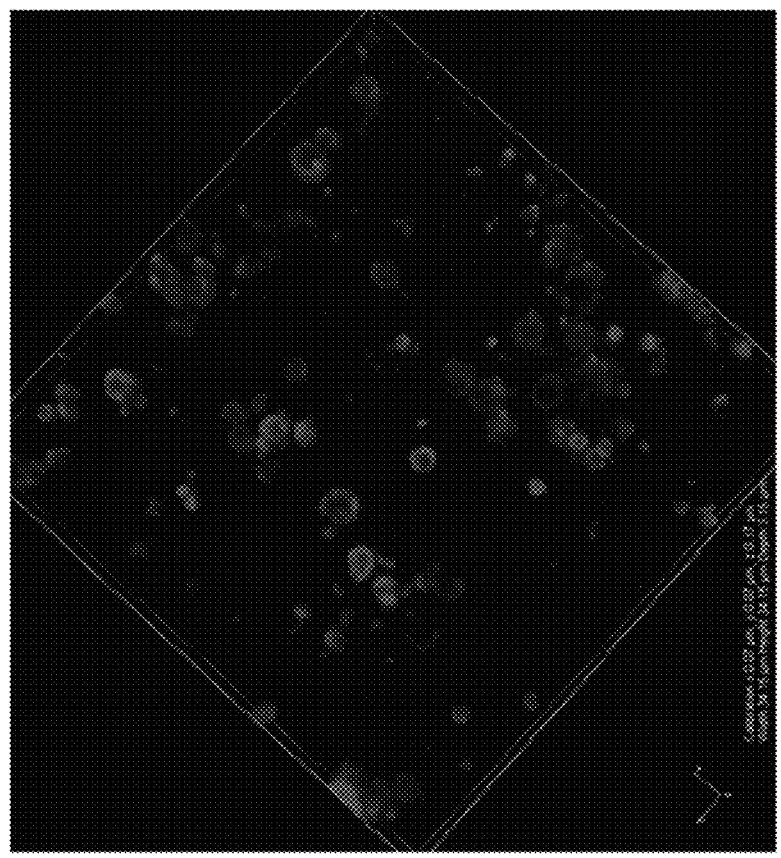
FIG. 11D shows a florescence optical image of DNA-label cy5 red encapsulated by $CaCO_3$ particles.
Figure 11C:
FIG. 11C shows an optical image of magnetic particles encapsulated $CaCO_3$ solution with Magnetic Bar.

FIGS. 11A-11C show that engineered particles containing magnetic particles and DNA were fabricated and demonstrated that they have magnetic properties and include DNA labels. The shape of the particles keeps consistently spherical morphologies.

The Tracing of DNA Amounts in the Synthesis

A detailed study to monitor each step of CTAB-DNA CaCO3 tracer particles was conducted to further quantify the containment of DNA inside of the nanoparticles. The following procedure (FIG. 9) provides general guidance to synthesize CTAB-DNA CaCO3 particles as well as to monitor the amount of DNA containment.

Figure 12:
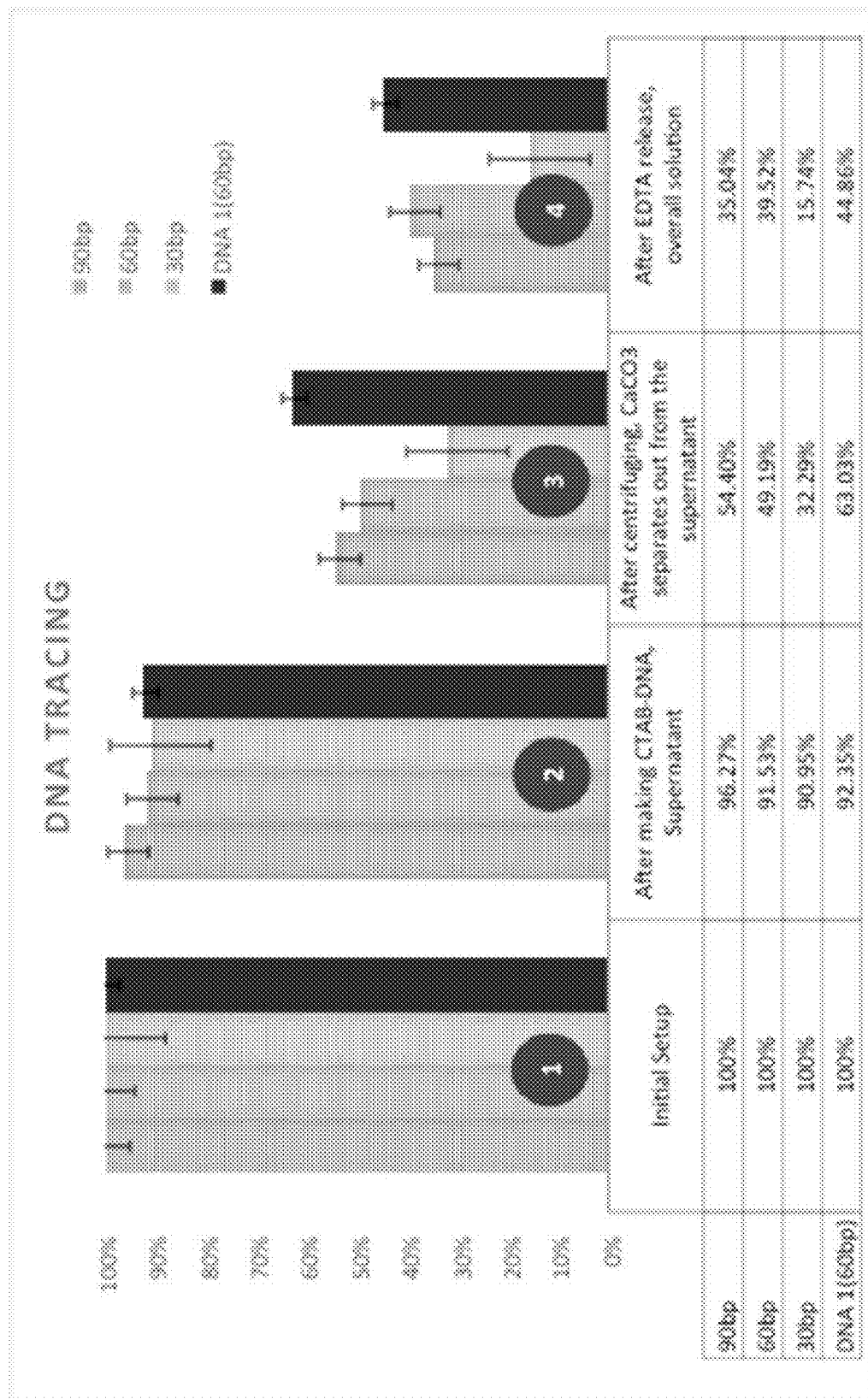
FIG. 12 shows DNA amounts in the particle system in various steps.

UV-vis absorption was applied to quantify the amount of DNA in each step. Among all steps of synthesis, there were important steps reported. The detailed information is shown in FIG. 9 and FIG. 12. It was confirmed that the final product after all synthetic treatment effectively contained at least 30%-40% of DNAs in the particles varied by the sizes of DNA. Another DNA #1 that possesses 60 bases and is capable to form a hairpin structure was encapsulated into CaCO3 microparticles. The results of the DNA losses in each step were lower than previous DNA samples. It was believed that bulky and more negative charged DNA can be encapsulated more effectively. This is related to the CTAB surfactants modifying the DNA exhibiting positive charges while DNA's phosphor backbone exhibits negative charges. The unstructured designs in 30 bp, 60 bp, and 90 bp will random fold to minimize the negative charges before the contacts with CTAB. However, DNA 1 was designed to form hairpin structure, which exhibits more negative charges and prevents itself to reach the minimum negative-charge structure. Hence, the hairpin DNA could form strong bonds with CTAB and better encapsulated into the CaCO3 microparticles.

The pH Sensor Using DNA Secondary Structure with Plasmonics

Figure 13B:
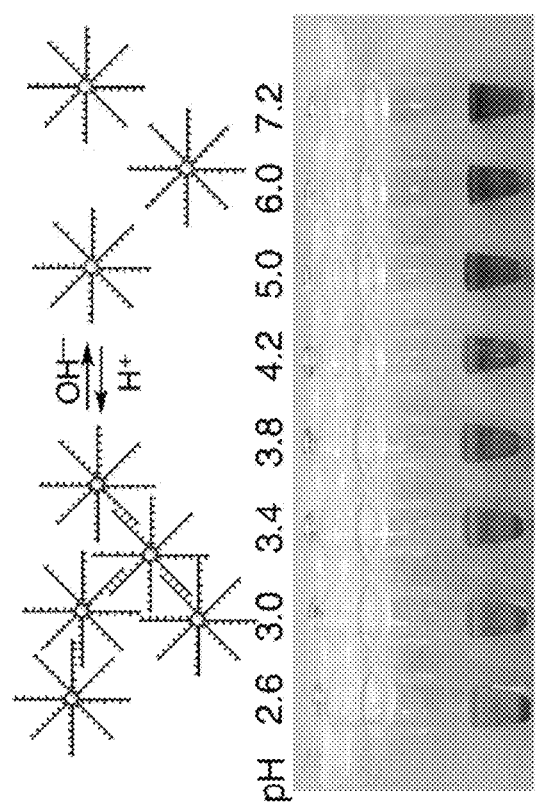
Figure 13A:
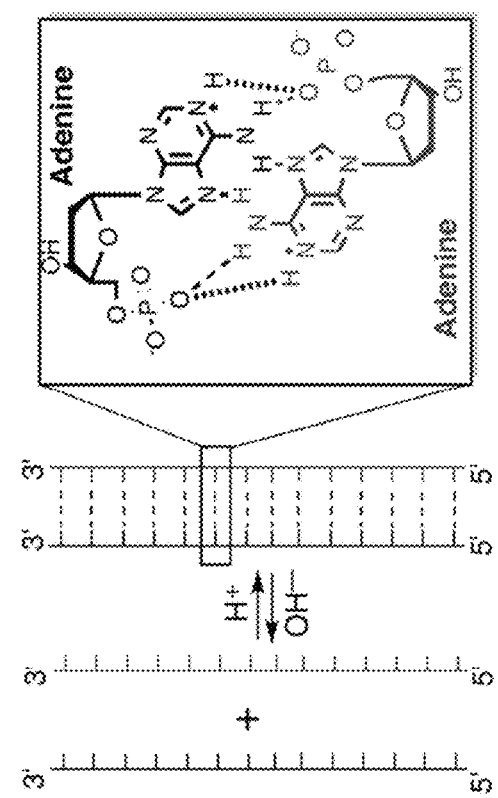

One of the DNA secondary structures, A-motif, forms non Watson-Crick base pair. The construction of A-motif is depending on pH. For instance, adenine pairs with adenine and then the two single-stranded DNA forms duplex in acid condition, while the duplex will break in neutral condition (FIG. 13A).

Using the A-motif with plasmonics of gold nanoparticle, pH sensor was developed according to published paper. See, Sasha, S. Chakraborty, K. & Krishnan, Y. Tunable, colorimetric DNA-based pH sensors mediated by A-motif formation. *Chem Commun* 48, 2513-2515 (2012). Gold nanoparticle aggregated in acid condition since DNA on the gold nanoparticle formed A-motif with other DNA on other gold, while gold nanoparticles were dispersed in neutral condition. As a result, color change from blue to red (low to high pH) was observed as function of pH through gold nanoparticle aggregation (FIGS. 13B and C). The sensor recognized between pH 3 and 5 (FIG. 13D).

The pH Sensor in Oil

Figure 14:
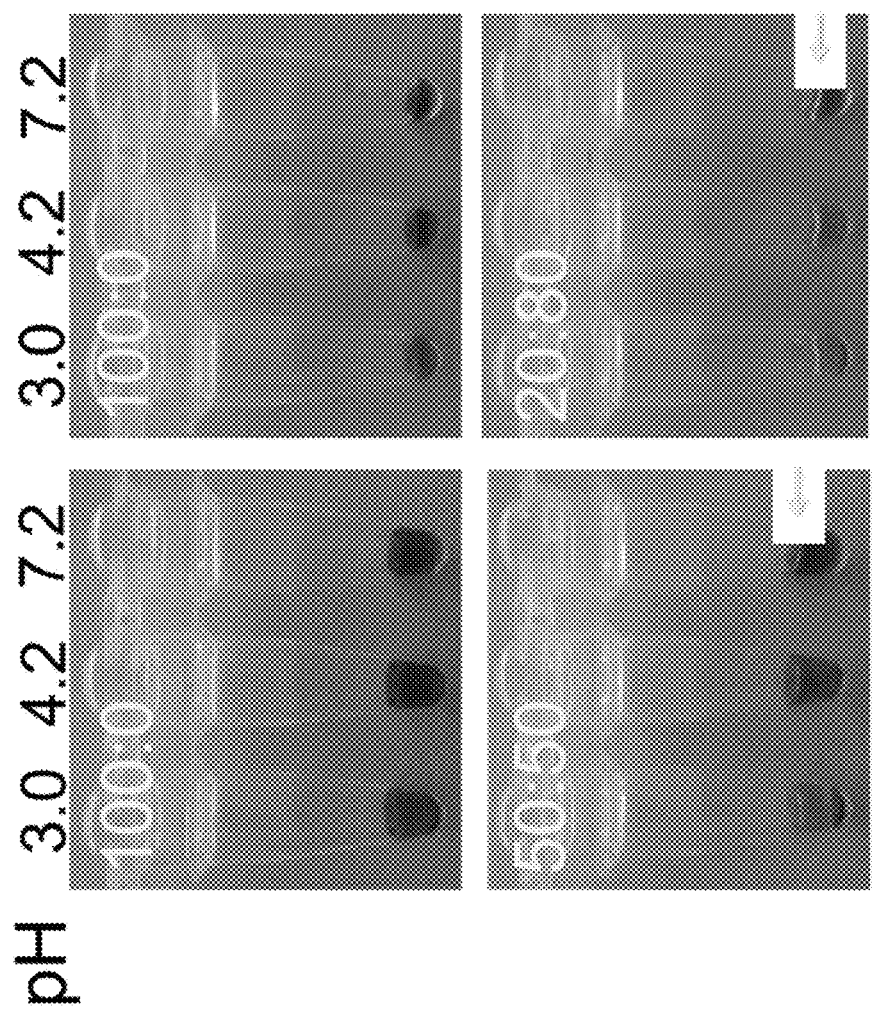
FIG. 14 shows the pH sensor working in oil condition.
Figure 15B:
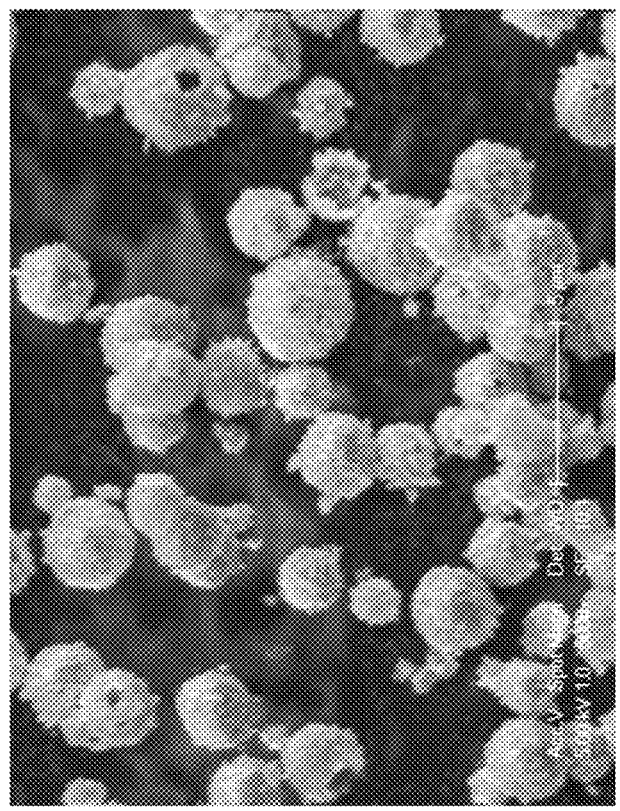
FIGS. 15A-15D show SEM images of calcium carbonate hollow spherical particles with different sizes. Scale bar, 5 um.
Figure 15A:
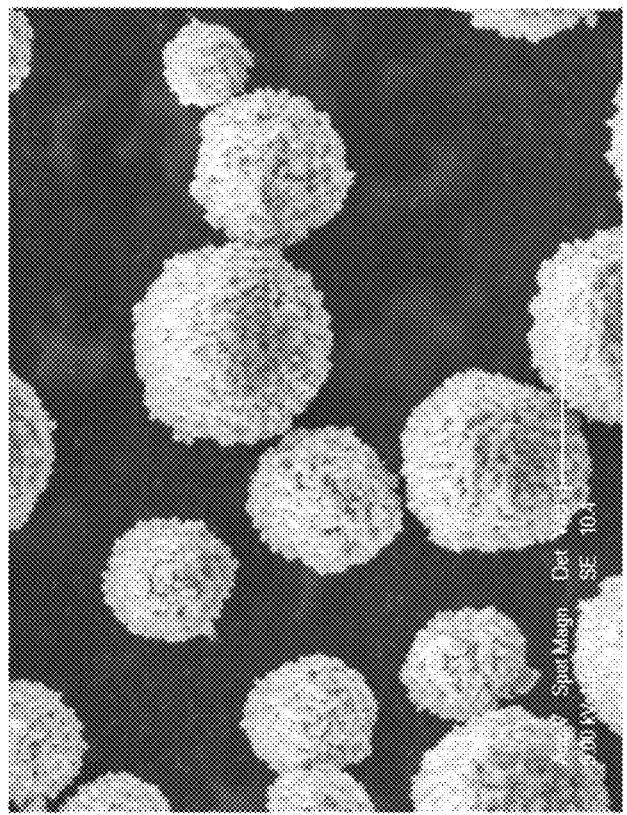
Figure 15D:
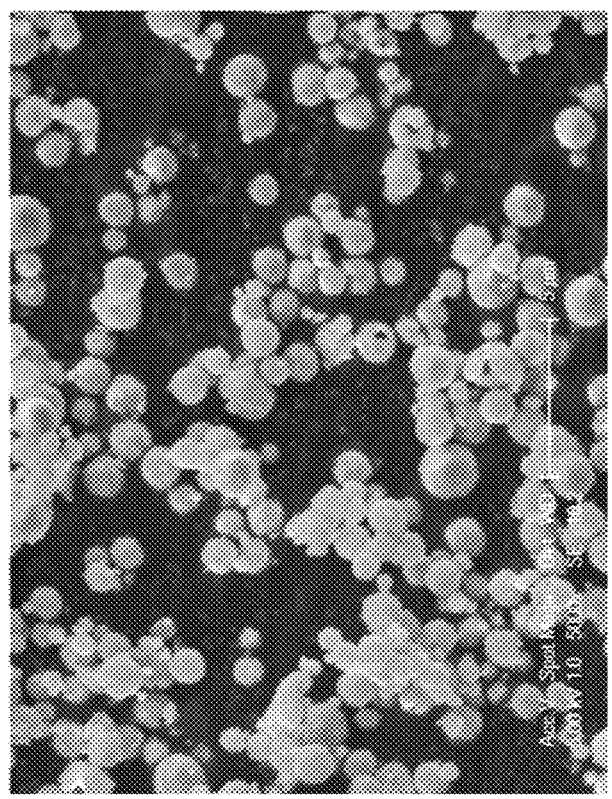
Figure 15C:
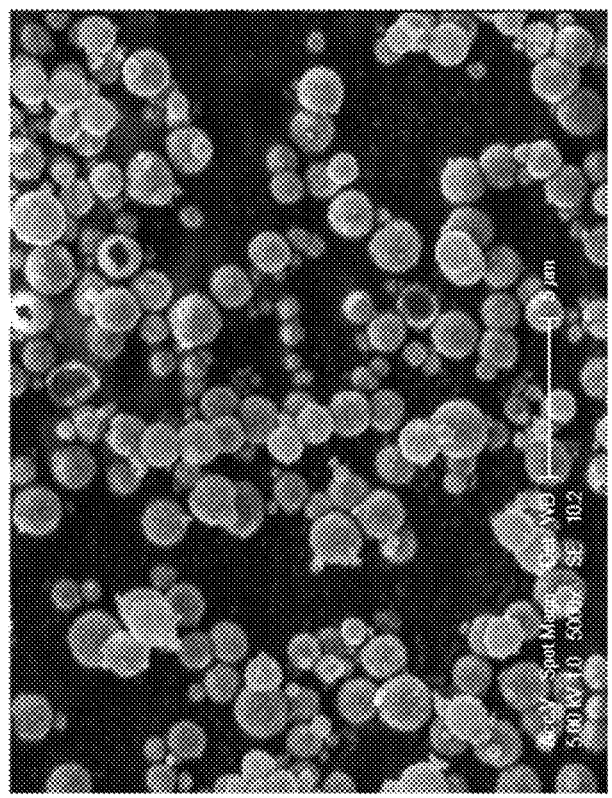
Figure 16:
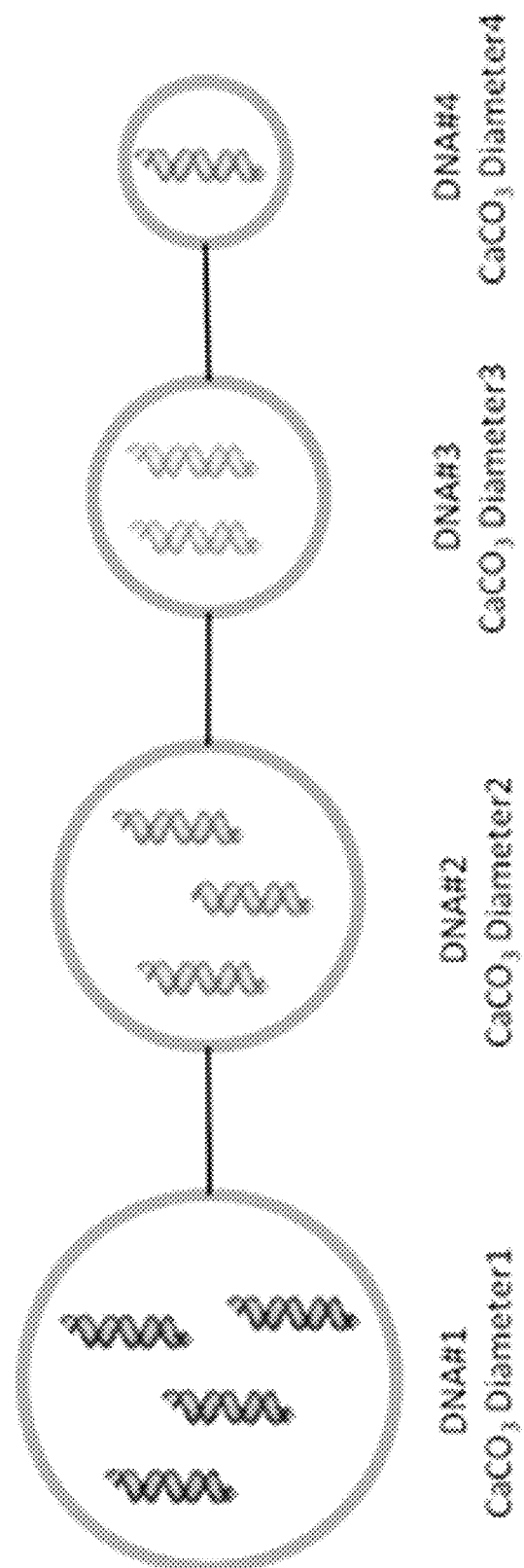
FIG. 16 shows design of the DNA encapsulated pore size sensor.

In order to examine that the pH sensor works in more practical condition, the probe was added to buffer/oil solution in variety of pH. The buffer/oil solution was prepared as a ratio of 50:50 and 20:80 with stirring vigorously, and then the probe was added. In the ratio of 50:50, the color change based on gold nanoparticles was almost same as that under only buffer solution (FIG. 14 left row). In contrast, the change color of gold nanoparticles at pH 4.2 was same as that at pH 3 in the ratio of 20:80 (FIG. 14 right row). The change color between pH 3 and 7.2 was apparent, indicating that the pH sensor here could work even in oil condition. The pH sensor in buffer condition is shown in the top panel and oil condition is shown in the bottom panel (left, 50:50; right, 20:80 (buffer to oil)). Arrows show oil.

Control the Size of Calcium Carbonate Hollow Spherical Particle for Potential Pore Size Sensor It is important to understand the pore size underground for the oil field. The advantage of this micro-sensor system is that not only the inner sensor could be designed; the outside calcium carbonate shell can also be controlled. Here the sizes of calcium carbonate spherical particles were controlled by changing the SDS concentration or adding citrate additives. As FIGS. 15A-15D show, lower SDS concentration will enlarge the particles, while the citrate will decries the particles size. Dynamic light scattering was also used to confirm the size changes of these samples. It gave the average size of 5.5 um, 3.7 um, 1.6 um, and 1.4 um for the samples in FIGS. 15A-15D, respectively.

This discovery enables us to develop DNA encapsulated pore size sensor for understanding the conditions underground. As FIG. 6 shows, different DNA can be encapsulated into different sized calcium carbonate spherical particles, and these pore size sensors travel underground with the oil. The recovery of the DNA species was analyzed to understand the pore size underground.

Other Modification and Functionalization to the Calcium Carbonate Particles

Figure 17B:
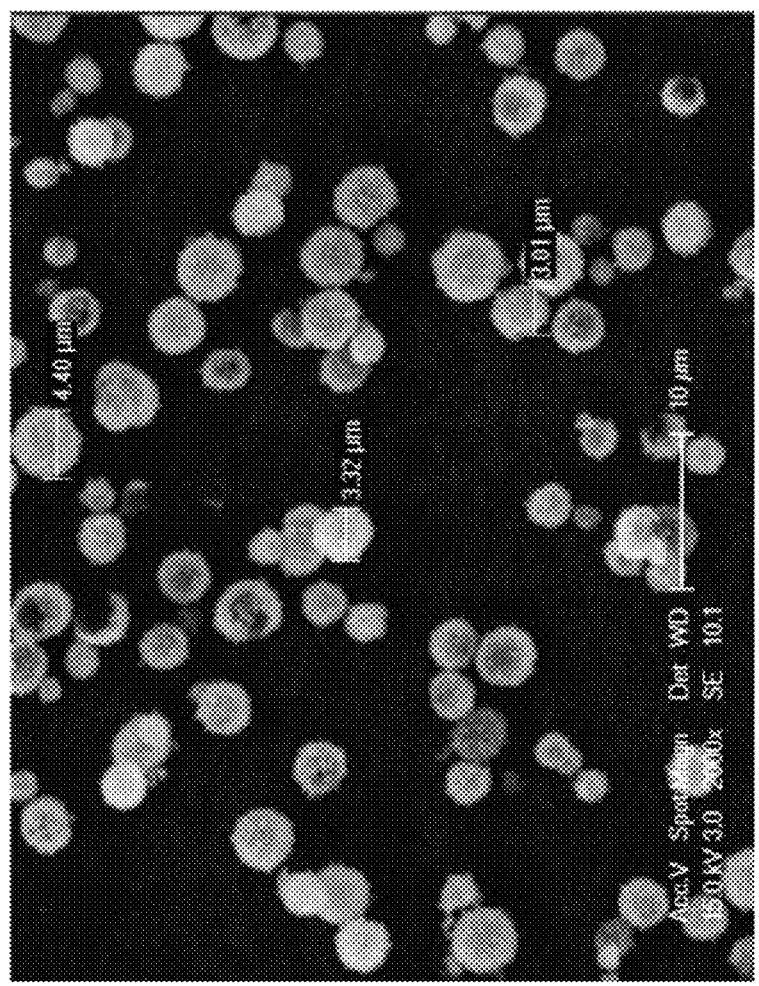
FIG. 17B shows its SEM image.
Figure 17A:
FIG. 17A shows regularly synthesized calcium carbonate hollow spherical particles.
Figure 17D:
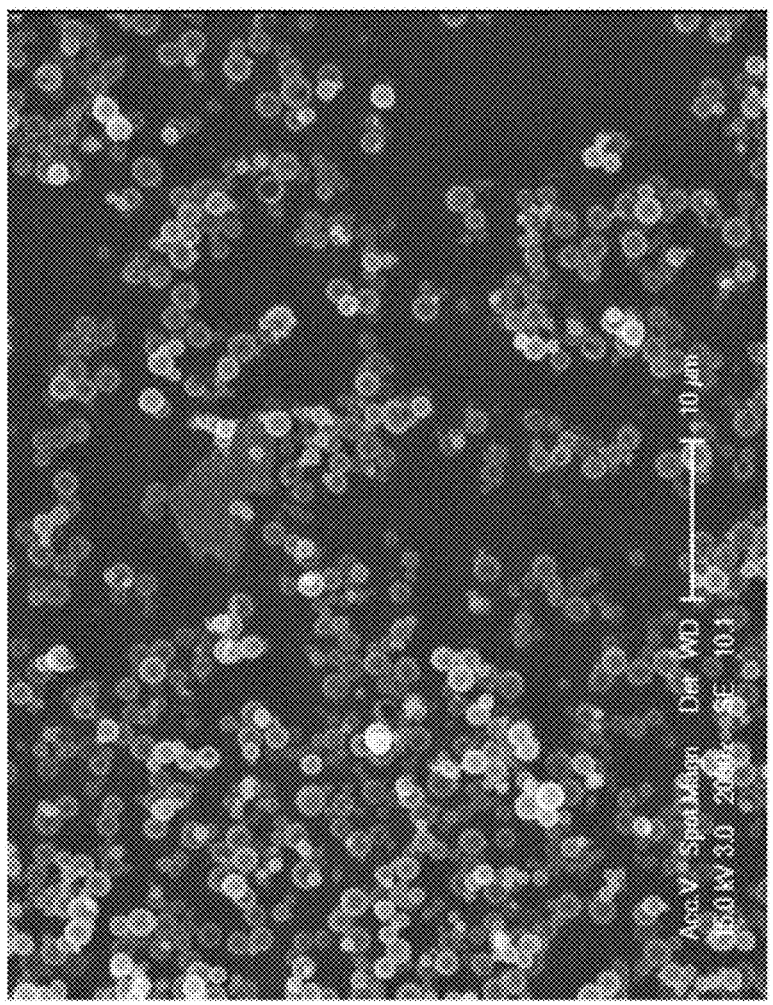
FIG. 17D shows its SEM image.
Figure 17C:
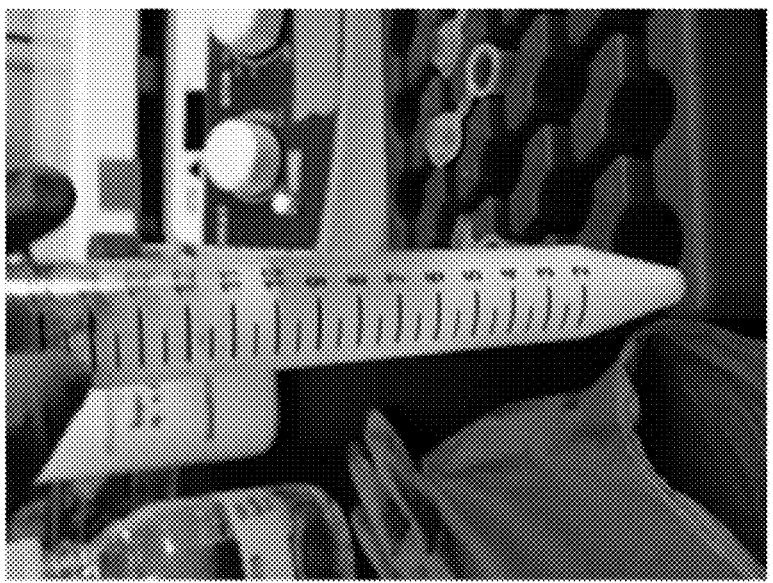
FIG. 17C shows adding citrate to the regular calcium carbonate particle synthesis.
Figure 17F:
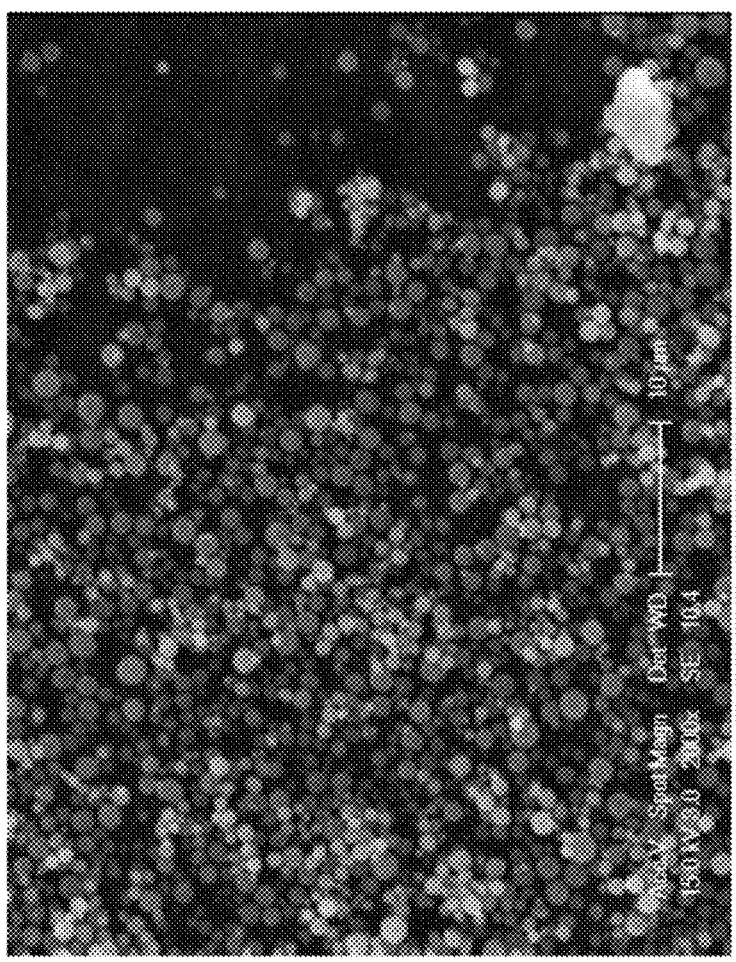
FIG. 17F shows its SEM image. All SEM scale bar 10 um.
Figure 17E:
FIG. 17E shows adding polymer to the regular calcium carbonate particle synthesis.
Figure 17E:
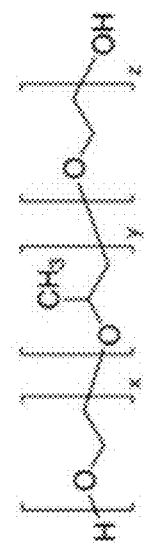

As the inorganic calcium carbonate may have higher density than oil, it may fall down while traveling with the oil flow, which is not good for sensing and recovery of the sensors. To solve this problem, there are two solutions to modify the synthesis procedure to make the calcium carbonate more buoyant. Citrate is added in the synthesis, the smaller calcium carbonate particles (FIGS. 17C and 17D) seem more buoyant than the regular calcium carbonate (FIGS. 17A and 17B). A polymer id added to the synthesis, FIGS. 17E and 17F, which have the longest floating time in the test.

Figure 18A:
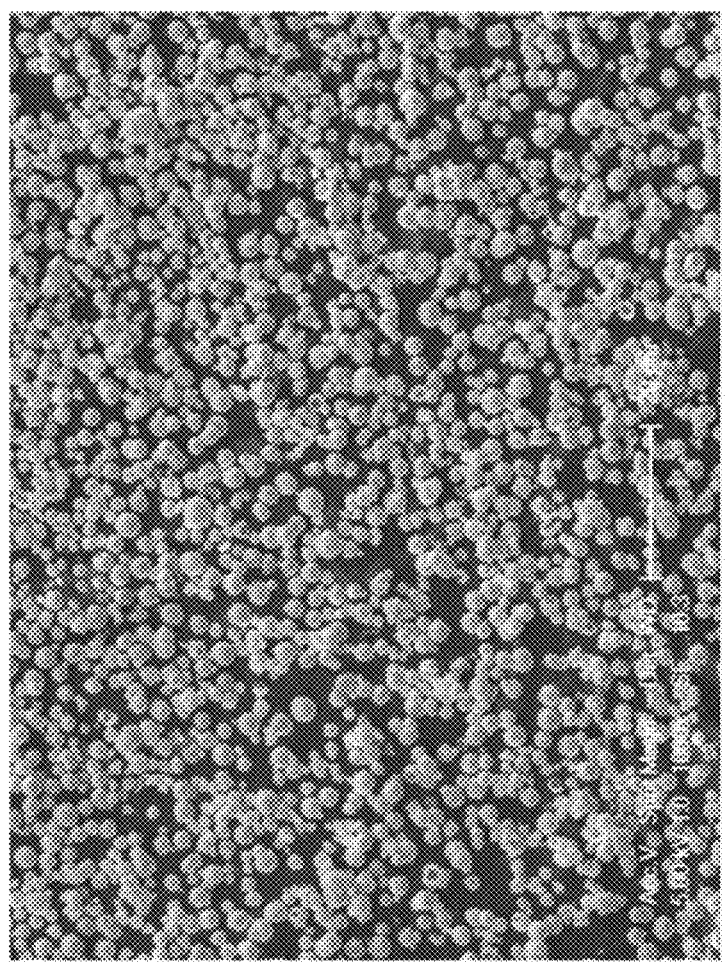
FIG. 18A shows SEM image of the UCNPs encapsulated CaCO3 particles, scale bar 20 um.
Figure 18C:
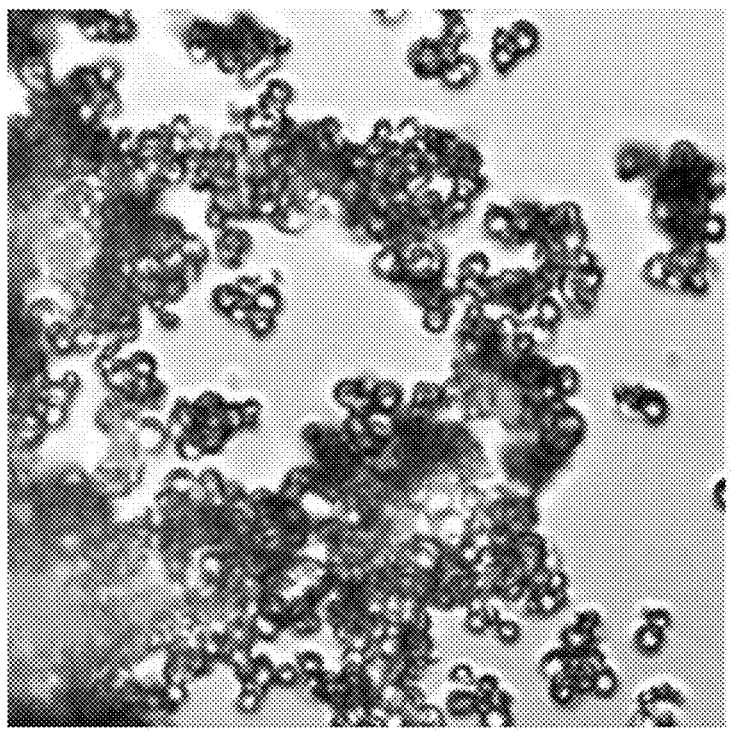
FIG. 18C shows two photo microscopy image of the UCNPs encapsulated $CaCO_3$ particles, scale bar 4 um.
Figure 18B:
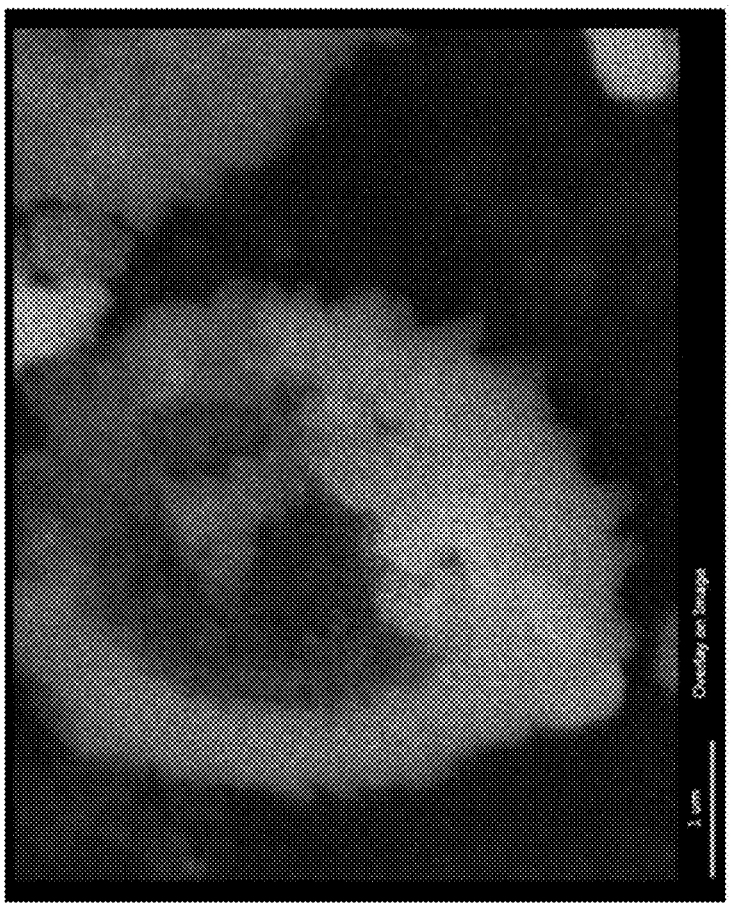
FIG. 18B shows EDX scan and SEM image overlay of the UCNPs encapsulated $CaCO_3$ particles, blue-calcium, yellow-yttrium, scale bar 1 um.

The upconverting nanoparticles (UCNPs) have been widely used for sensors, and imaging device for detection. As their advantage of their good visibility in oil, they can be used as the signal for the sensor. Here NaYF4: Yb,Er was successfully encapsulated into the $CaCO_3$ particles, shown by FIGS. 18A-18C. SEM and two photon microscopy confirms the encapsulation of the UCNPs. This structure can be used as a platform to develop different kinds of sensors for the EOR.

The Thermal Sensor Using DNA Nanostructure

A. Monomer-dimer DNA Thermal Sensor

What makes the DNA an extraordinary sensor is the inherit ability to change and transform its own structure in responding to the change of the conditions, such as temperature. The general approach is to utilizing the difference of melting temperatures of the DNA structures between a dimer and monomer (shown in FIG. 19A). The dimer and a monomer structures were initially prepared to mix together. At a specific temperature, both structures will be annealed. After it cools to the room temperature, the monomer structure as a more stable structure is a preferred position. On the other hand, if this specific temperature is not reached, both structures as a mixture coexist in the sample. Hence, this appearance of this structure will refer to a specific temperature has reached. However, if the temperature is any value that is higher than this specific temperature, the dimer structure will disappear. Hence, the disadvantage of this single DNA sensory system is only referring the temperature it experiences to a cutoff value below or above this specific temperature instead of an exact value. More DNAs are needed. The correlations between DNA sequences and temperatures have been well understood. Many more DNAs referring to different temperatures can be designed. Shown in FIG. 20, multiple DNA sensory systems are made to detect a specific value of an environment. The scheme of microparticle encapsulated system is used indicated in FIG. 20.

Figure 21:
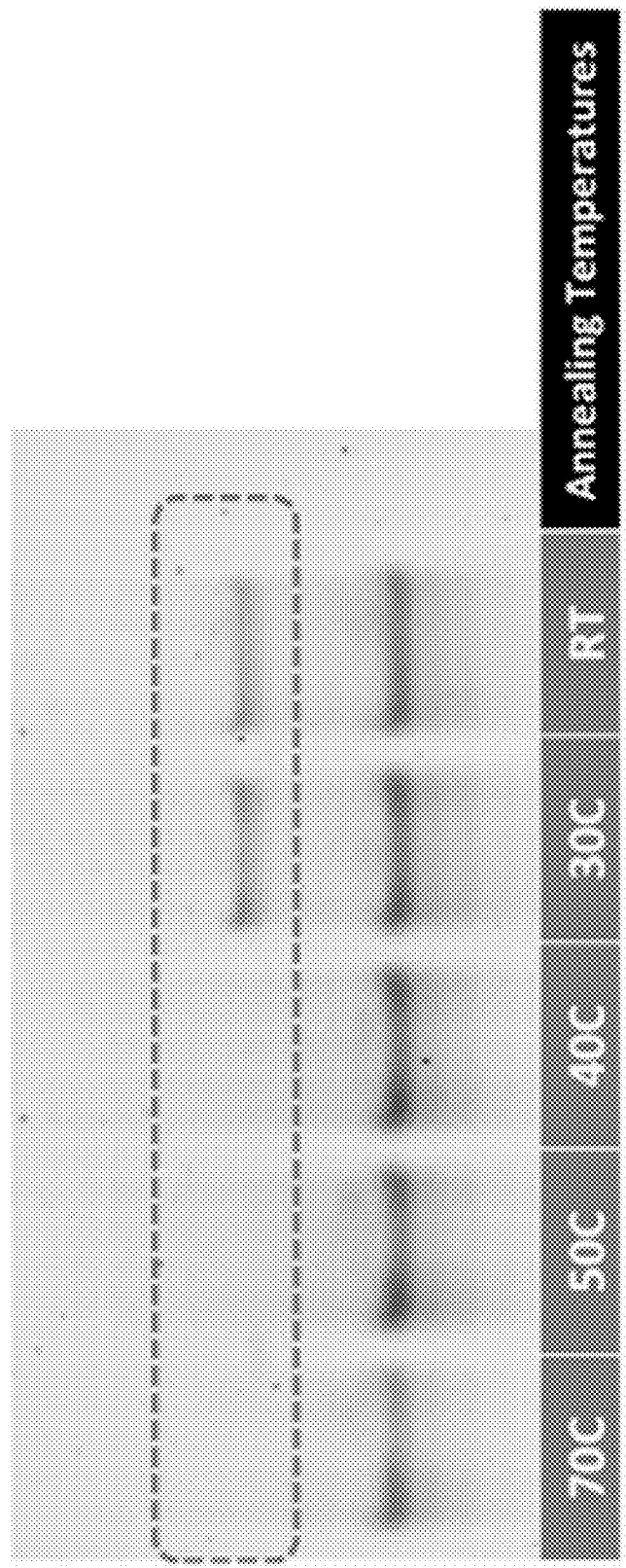
FIG. 21 shows gel electrophoreses of a single DNA incubated at different temperatures from room temperature (RT), 30° C., 40° C., 50° C., to 70° C.
Figure 22:
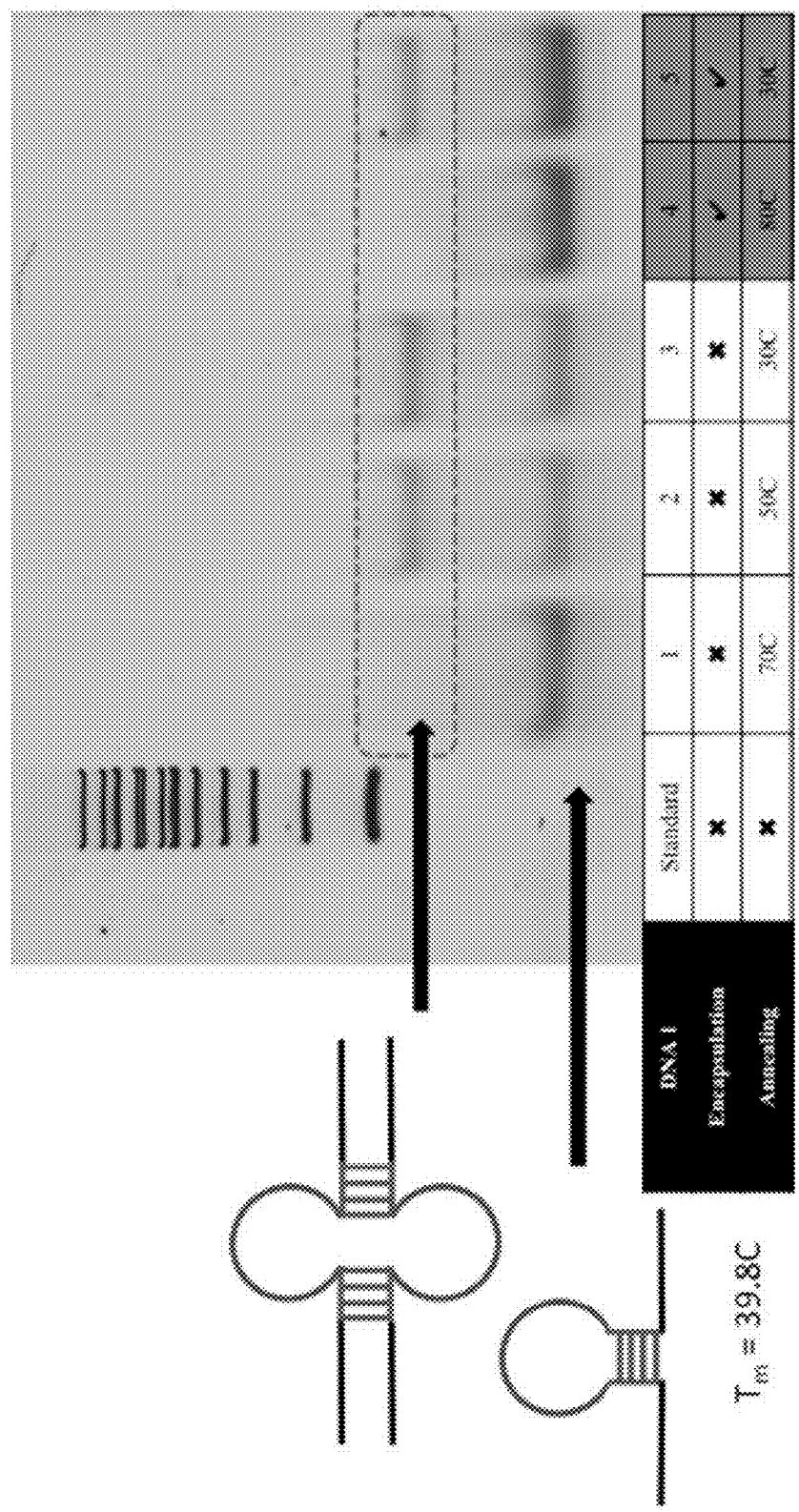
FIG. 22 shows gel electrophoreses data of encapsulated DNA sensors in $CaCO_3$ and incubated at 80° C. and 30° C. The top band or dimer structure only appears at 30° C. sample.

The initial test result shown in FIG. 21 indicates the top band or dimer structure only appearing in 30° C. or below. This is only highly correlated to the magnesium used as well. Here the salt concentration was kept at 2.5 mM. Improved from this result, the DNA sensor was encapsulated into the $CaCO_3$ microparticle. Two samples were separately incubated in 30° C. and 80° C. oven. Shown in FIG. 22, since the cutoff line is at 50° C. when the magnesium concentration was 12.5 mM, the top band expectedly showed at 30° C. but not 80° C. This indicates beyond 30° C., the dimer structure is annealed and transformed to be the monomer structure.

Figure 23:
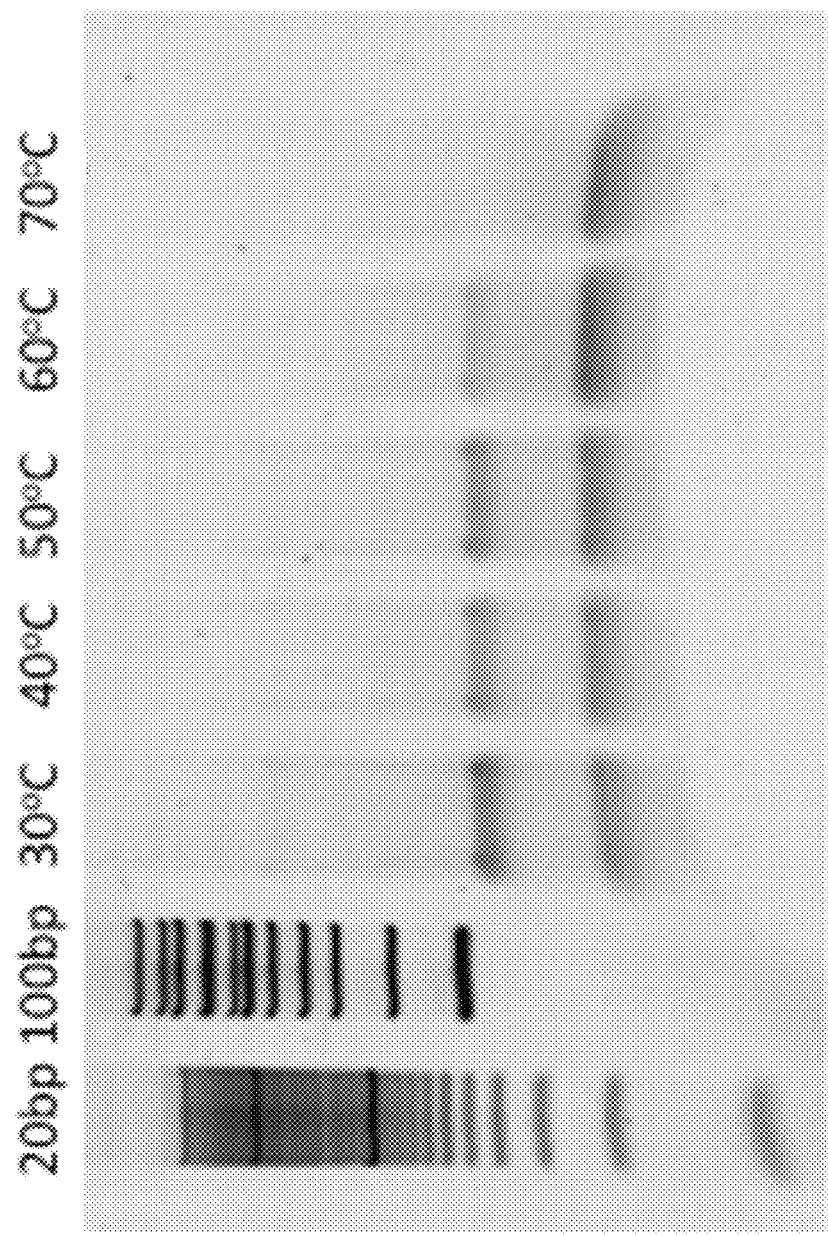
FIG. 23 shows gel electrophoresis data of encapsulated DNA sensors in $CaCO_3$ and incubated at 30, 40, 50, 60, 70, and 80° C.

Multiple DNA sensors have been designed including DNA 1, DNA 10, DNA 11, and DNA 12. Among them, DNA 1 was first discovered to have response to the temperature. The initial test result of DNA 1 shown in FIG. 21 indicates the top band or dimer structure only appearing in 30° C. or below. This is only highly correlated to the magnesium used and the salt concentration was kept at 2.5 mM. This triggers an extensive study in understanding about the monomer and dimer DNA system. A systematic study was shown in FIG. 23 while the magnesium concentration was kept at 12.5 mM, which was the recommended optimal salt concentration in literature. For DNA 1 at 12.5 mM salt, the cutoff temperature was 60° C., which is consistent to the theoretical annealing temperature of 58.9° C. The top band mentioned earlier was dimer drawn as FIG. 23 while the lower band was monomer. Only when the temperature reaches to a point higher than annealing temperature, the top band or dimer can disappear or transform to be a stable state of monomer. The top band or dimer structure only appears from 30° C.-60° C. sample indicating the annealing temperature is around 60° C. DNA 11, which was designed to have different positions of its top band and lower band, was tested separately as well shown as FIG. 23. Meanwhile, DNA 11 had a different sensor point, which provided a cutoff temperature at 70° C. Mixing two DNA sensors together can potentially trigger interactions of two DNAs, FIG. 23 shows there was no interference. A surprising discovery for DNA 11, it had third band that possessed a different cutoff temperature, which lied at 50° C. It was basically able to indicate two temperatures with one DNA sensor.

Figure 24A:
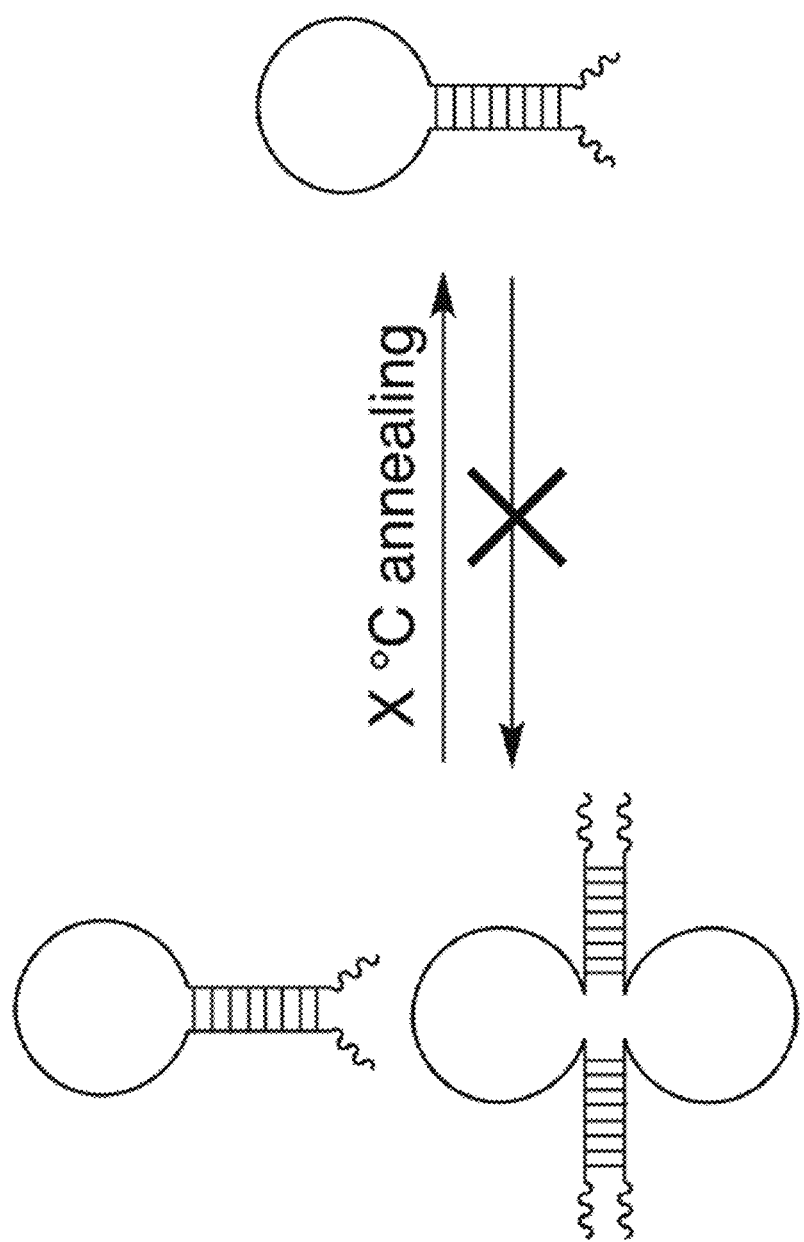
FIG. 24A shows schematic illustration of thermal sensor using DNA hairpin structure.
Figure 24C:
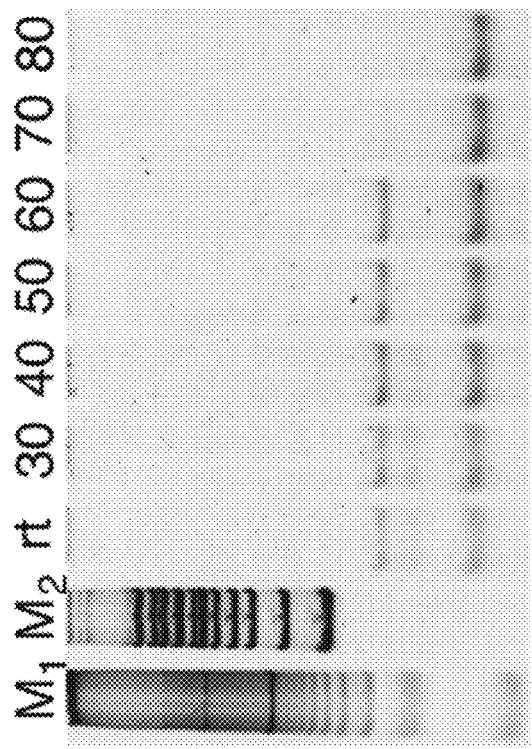
FIG. 24B shows sensor 1 (DNA1) and FIG. 24C shows sensor 2 (DNA11) recognized 60 and 70° C., respectively. Two kinds of hairpin structures worked as a thermal sensor. M1 and M2 are 20 bps and 100 bps ladder, respectively.
Figure 24B:
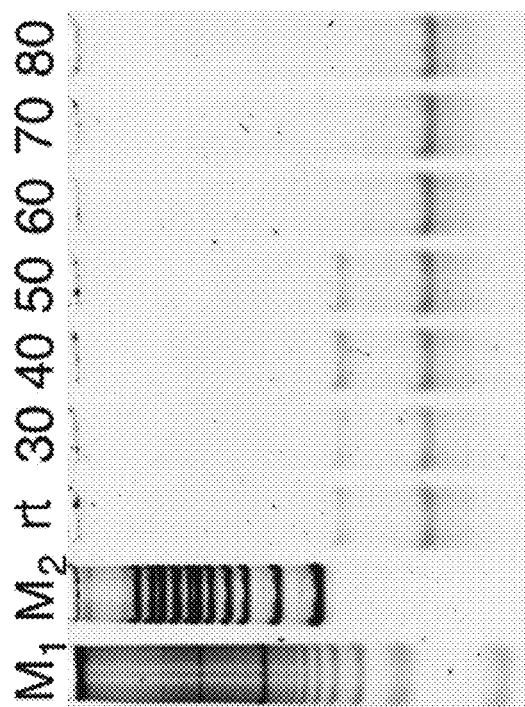
Figure 25A:
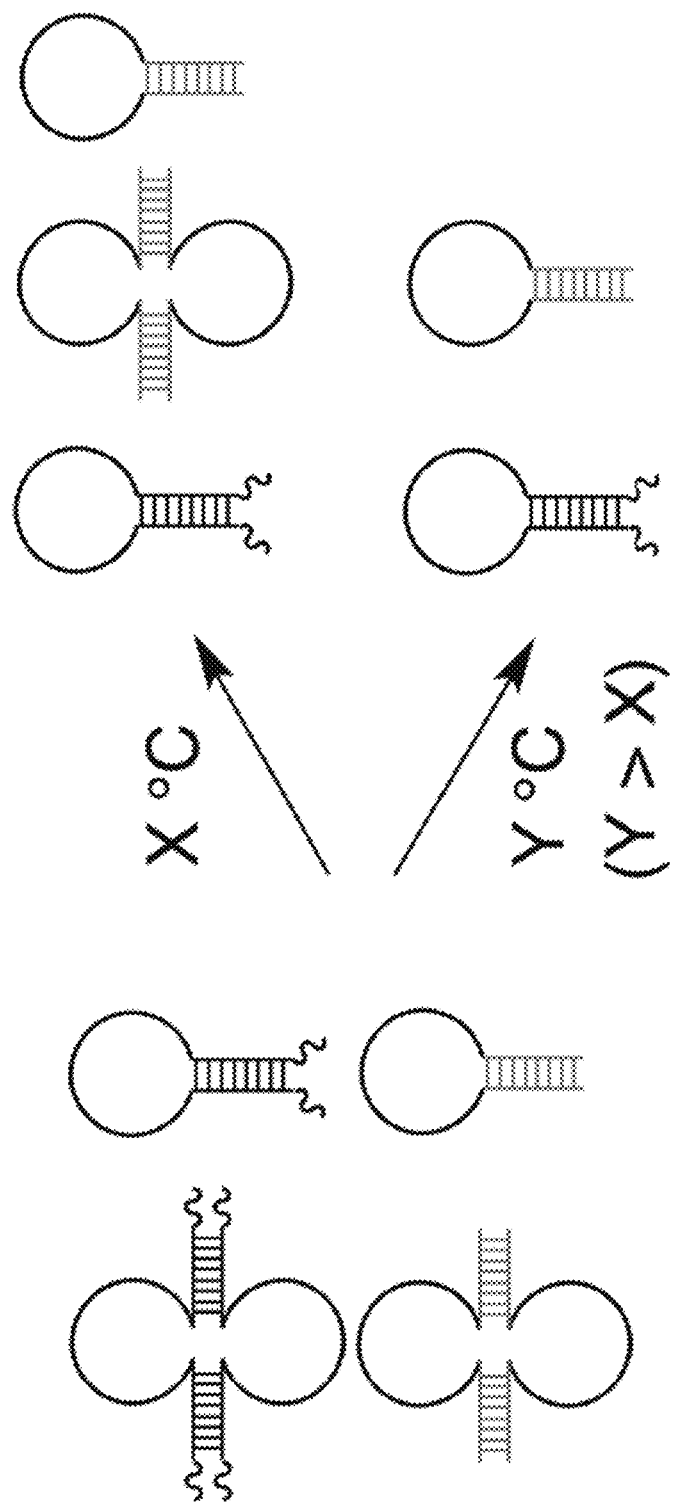
FIG. 25A shows schematic illustration of thermal sensor using DNA hairpin structures when DNA 1 and DNA 11 were put together.
Figure 25B:
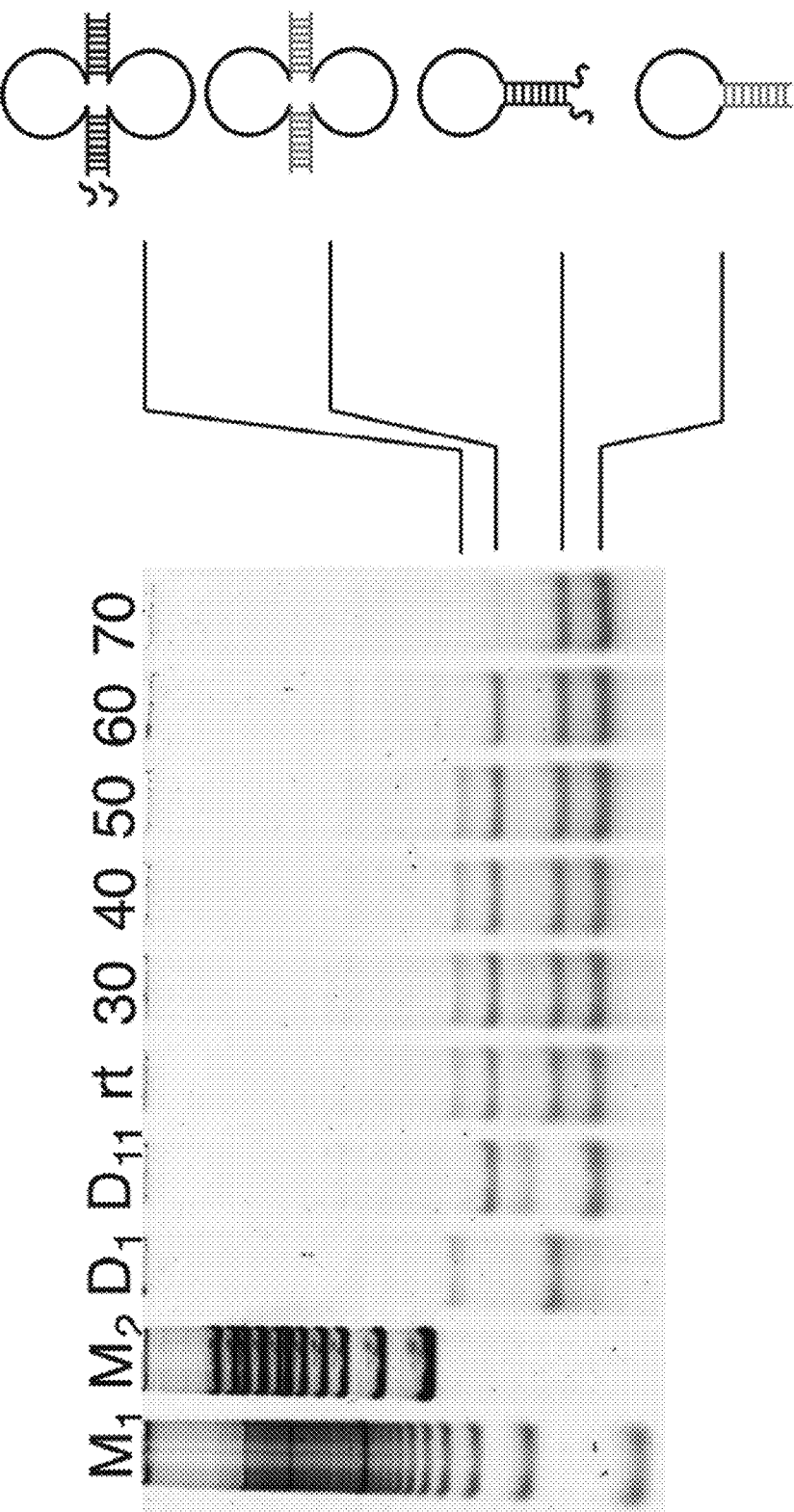
FIG. 25B shows the gel result when DNA 1 and DNA 11 were mixed together and ran through gel.

Improved from this result, the DNA sensor was encapsulated into the $CaCO_3$ microparticle. Two samples were separately incubated in 30° C. and 80° C. oven. Shown in FIGS. 24A-24C, since the cutoff line is at 50° C. when the magnesium concentration was 12.5 mM, the top band expectedly showed at 30° C. but not 80° C. However, when more temperatures were investigated, the actual temperature cutoff was between 60° C. and 70° C. indicating the annealing temperature was around 60° C. This discrepancy might be caused by EDTA, which had impacts on gel running and salt concentration.

B. Hairpin Structured DNA Thermal Sensor

Hairpin structured DNA upon encountering increasing temperature will extend to become linear in shape. The triggering temperature is dependent on the design of the DNA and its annealing temperature. Hence, based on the designs, various lengths of the hairpin structured DNAs will respond to a specific temperature, and collectively they can provide accurate measurement of underground temperature. For example, DNA 1 that has an annealing temperature of 60° C. is encapsulated in a microparticle shown in FIGS. 18A-18C, and DNA 2 that has responds to 90° C. is encapsulated in a green microparticle. Both microparticles sent to underground with chemicals and oils are experiencing an underground temperature of 75° C. As the result, the hairpin structure in DNA 1 will dominantly become linear structure according to sigmoid curve, while majority of the DNA 2 will keep the hairpin structure. If both linear and hairpin structures can be visualized and distinguished, the oil field operator will have a rough knowledge that the underground temperature is higher than 60° C. and lower than 90° C. Now if the interval of each type of DNA is smaller, such as 70° C. and 80° C., people will have more accurate temperature information. Hence, ideally in this schematic design, each type of DNA responding to a specific temperature with 1 degree C. apart is used, and together sensors include 30° C., 31° C., 32° C. . . . and up to 90° C.

The structures of hairpin and linear can be distinguished. Two approaches are available in both lab and industrial scales: chromophore based on FRET and gel electrophoreses. First, a pair of chromophores are selected and attached to ends of the DNA. FRET mechanism is utilized to sense the microscopic structural change of DNA. Shown in FIG. 27, the hairpin position of DNA 1 as a sample 1 will not emit any light because of the FRET. At hairpin structure, no light should be detected because the light emitted by the chromophore is absorbed by the quencher in the proximity. At linear structure, the light emitted by the chromophore is not absorbed because two molecules stay in a greater distance, and the signal of fluorescence can be easily detected. DNA sample 1 is responsible for the 35° C. while DNA sample 2 is responsible for the 55° C. After encountering an environment that is higher than 35° C., the light will be visible and signals the existence of linear shape. Meanwhile, another DNA 1a (shown in FIG. 26B) as complimentary strand is attached to the DNA 1 and keeps DNA 1 straightened even the temperature reverses. It is foreseen that the temperature will cool back before it emerges back to the ground level. Sample 2 DNA exhibits the similar mechanism except it responds to 55° C. instead of 35° C. The microparticles are collected and extracted from the oil mixture. The samples are directly run through with flow cytometry for the detection of fluoresced particles. The second approach to distinguish the structural shift is to apply gel electrophoreses. The advantage of using gel is minimizing the complicated modifications of DNA as the FRET, but the disadvantage is longer post-treatment to purify DNA. The gel electrophoresis technique allows distinguishing the structures by seeing bands on a gel. After the collection of the microparticles, EDTA is used to release the $CaCO_3$ and DNA is purified from the mixture. After applying voltage on a gel, the various structured and length DNA samples travels to different location within the gel which enables structural separation. The dye SYBR-safe is used to intercalate the DNA in order to becoming visible under UV-illuminator or typhoon.

$CaCO_3$ microparticles containing hairpin structured DNAs were inside oil well bore. Each particle is responsible for one temperature. With multiple particles on site, a collection of them can provide information about a specific temperature after analyzing the distributions of structures from various DNAs. The $CaCO_3$ microparticles will travel into oil underground, and come out from the production well for the extended reach well shown. The microparticles will be collected applying a magnetic field on the magnetite microparticles. DNA samples are released by EDTA and purified for the further analysis.

C. Branched Thermal Sensor

More convenient than the first design, branched thermal sensor allows to provide more accurate temperature information by itself while the first design requires multiple types of particles to facilitate the collection of accurate information. The design is centered by the gold nanoparticle branched by the multiple plasmonic nanoparticles with double stranded DNAs. The DNA from each branch is designed differently to correlate with an annealing temperature. Hence, with different temperatures encountered, a branch of the complex DNA structure might "shed" because of annealing temperature characteristics. After retrieving the DNA complex, the sample will be screened by several available techniques such as ELISA, gel electrophoresis, or optical change based on plasmonics.

Figure 28:
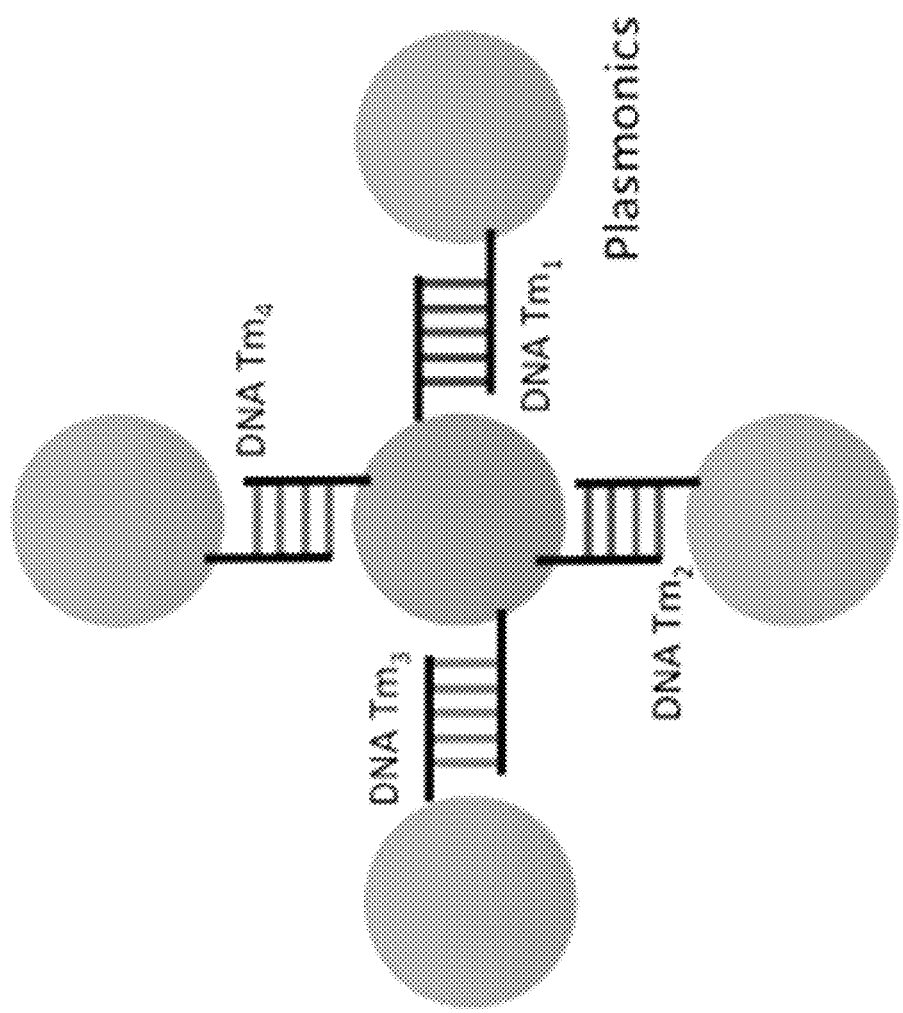
FIG. 28 shows the design of branched thermal sensor.

FIG. 28 shows the design of branched thermal sensor. The center of the complex is gold nanoparticle ranged in 10-20 nm. Each branch contains a DNA duplex linker that has a different annealing temperature. On the other end of the DNA duplex, a plasmonic nanoparticle is attached to facilitate the imaging of the characteristics of the DNA complex.

Ionization Strength Detector

Figure 19A:
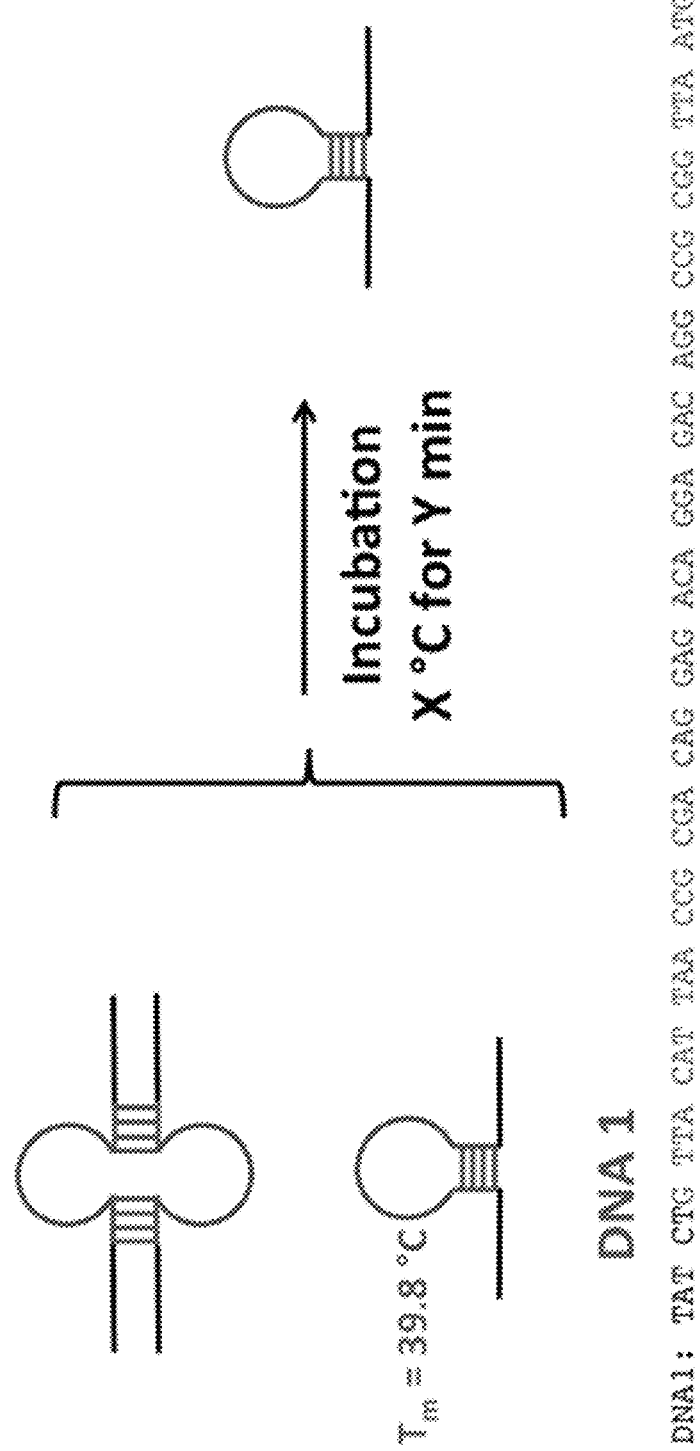
FIG. 19A shows a general scheme and concept of dimer-monomer DNA thermal sensor shows the conversion of monomer and dimer system to a monomer when the annealing temperature is reached.
Figure 19B:
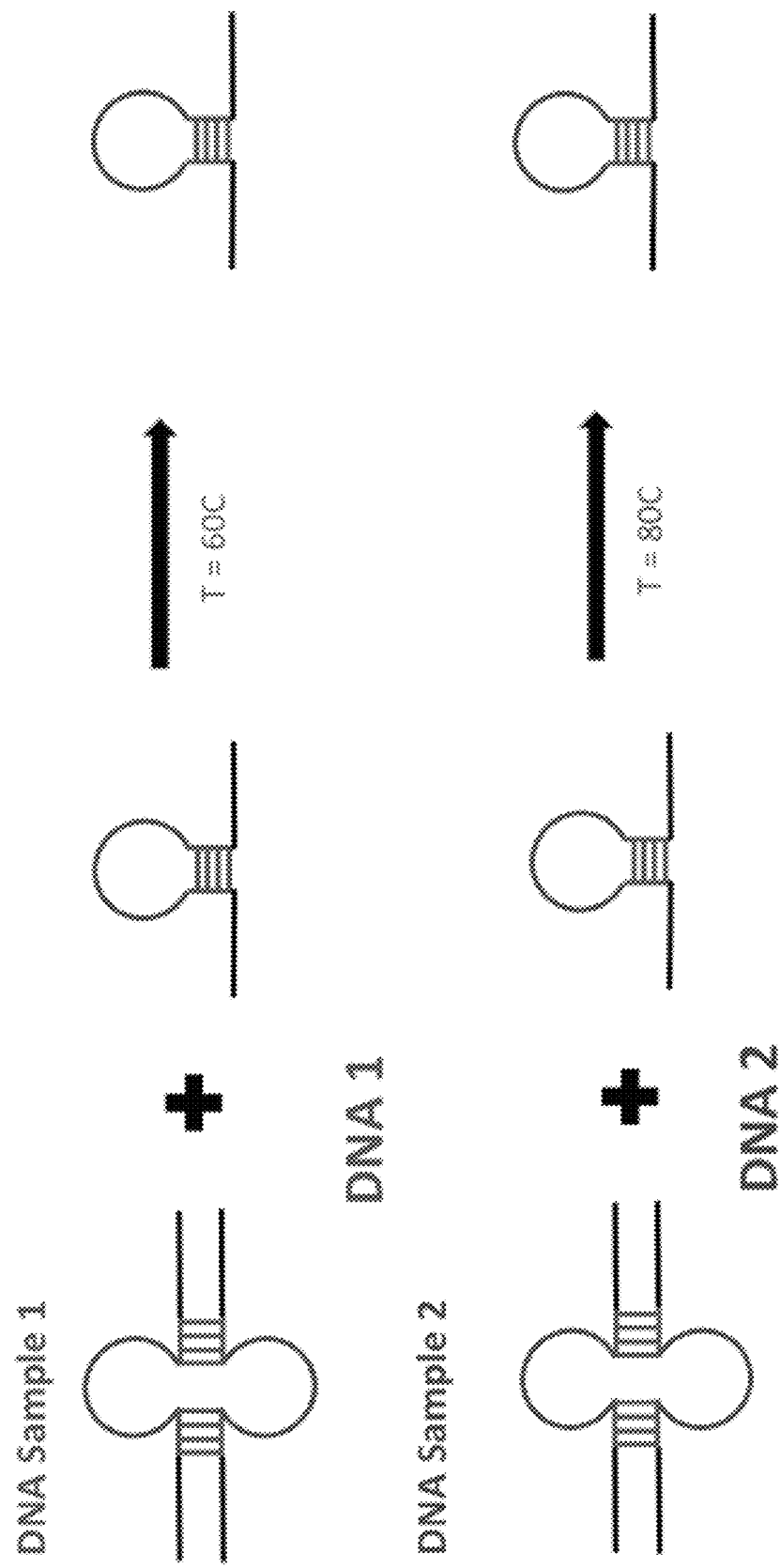
FIG. 19B shows when multiple DNA sensors are used, the system is improved to show a specific temperature it experienced instead of a rough cutoff temperature provided by a single-DNA sensor.
Figure 20:
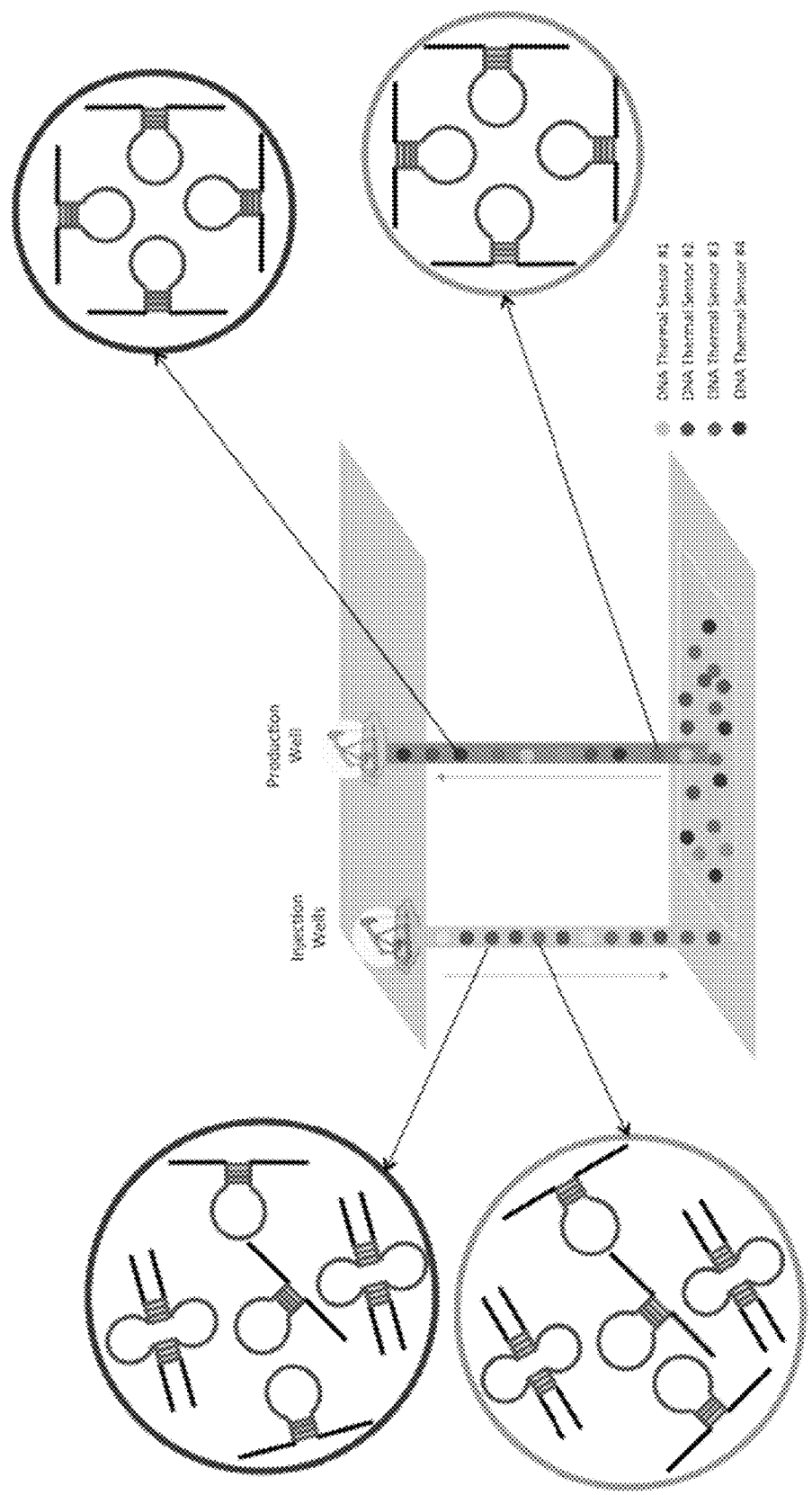
FIG. 20 shows the DNA sensory system is used in the oil reservoir scenario.
Figure 26A:
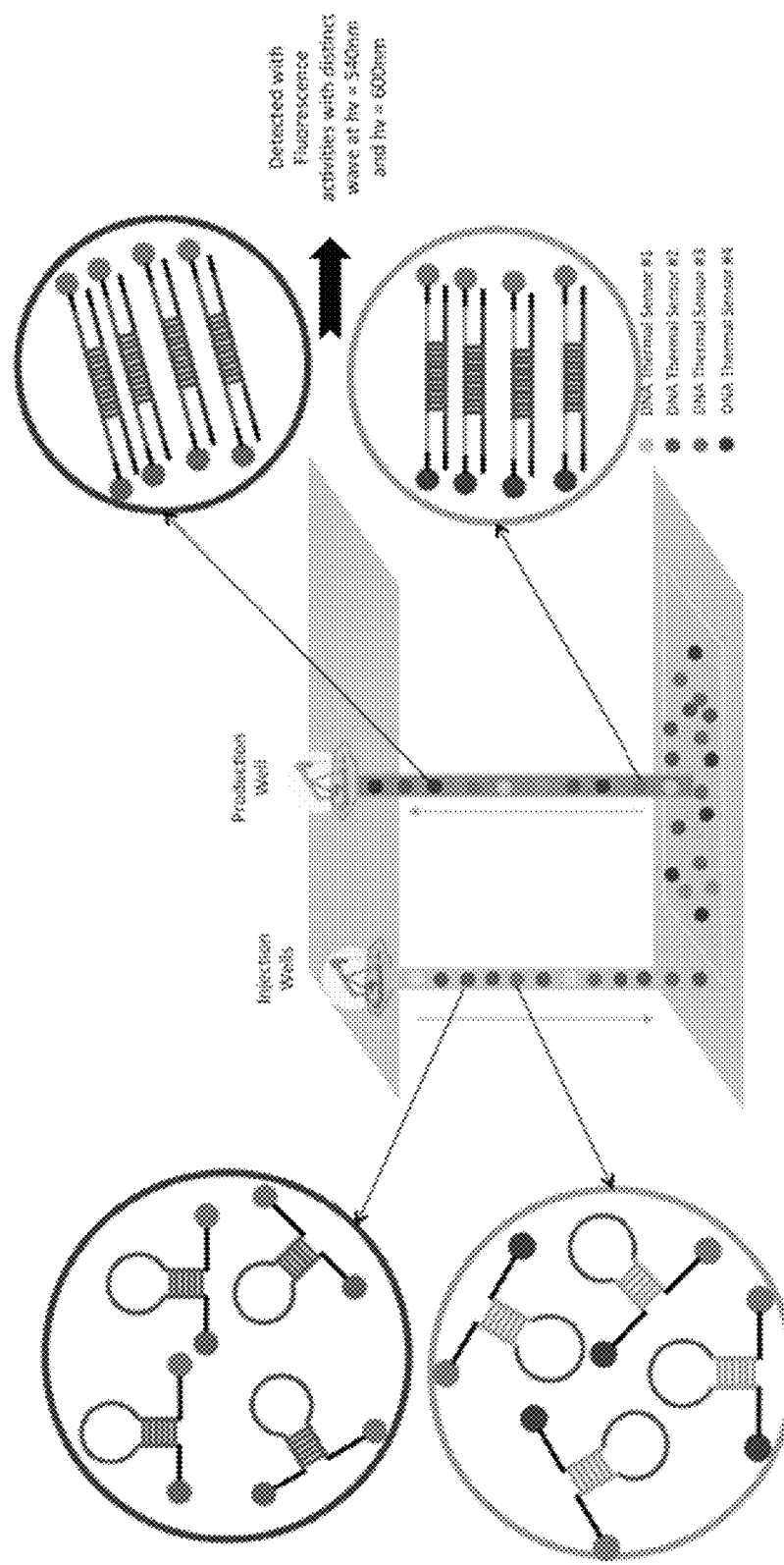
FIG. 26A-26B show $CaCO_3$ microparticles containing hairpin structured DNAs were inside oil well bore.
Figure 26B:
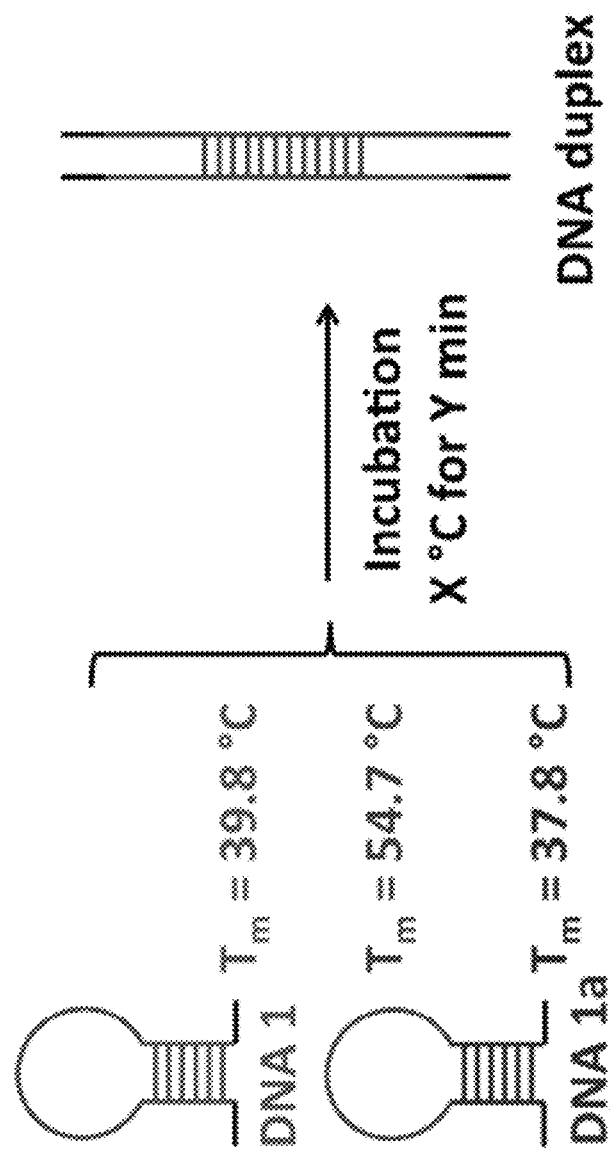
Figure 27:
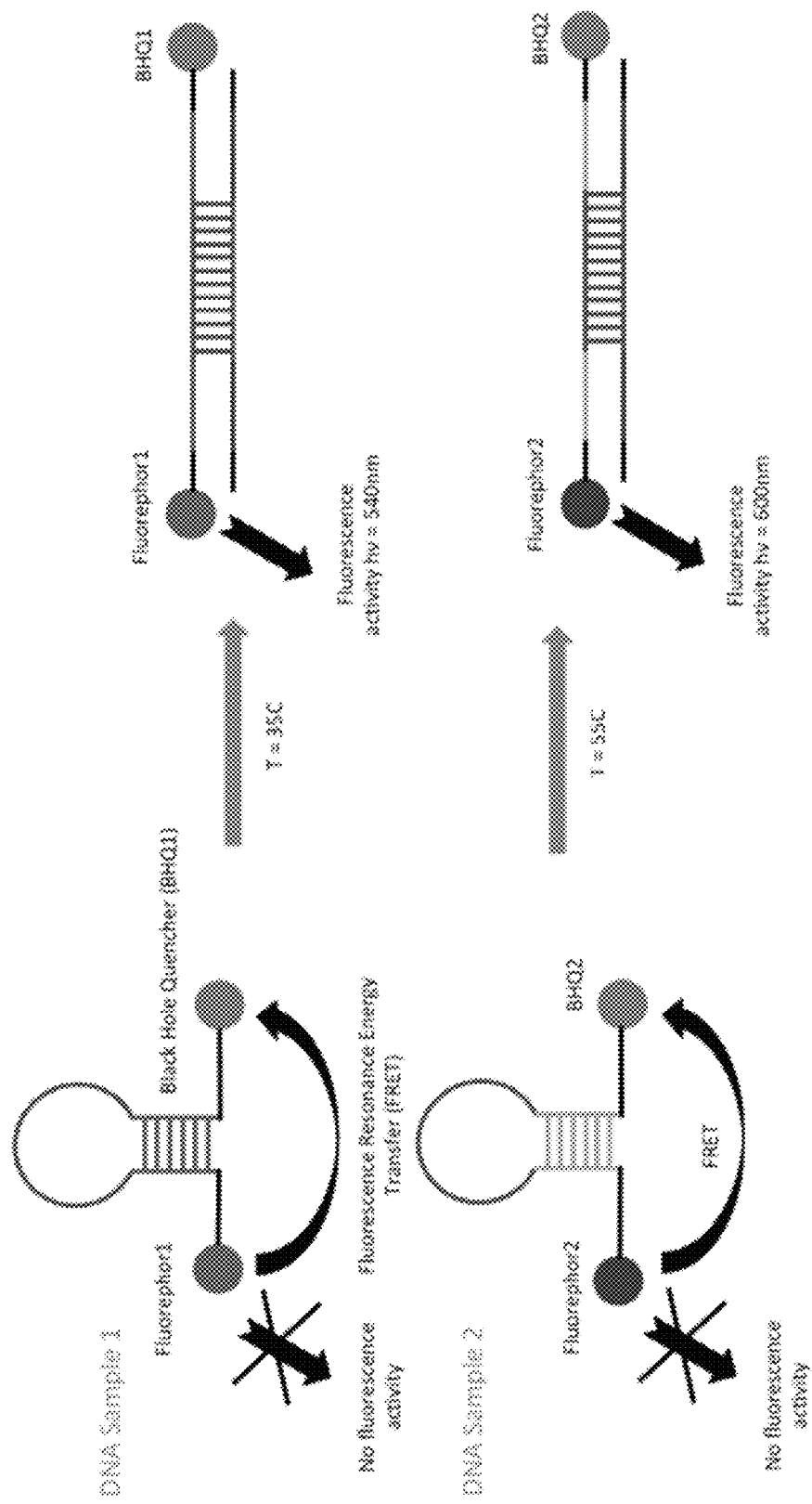
FIG. 27 shows scheme of FRET on the transition between DNA hairpin structure and linear DNA.
Figure 29:
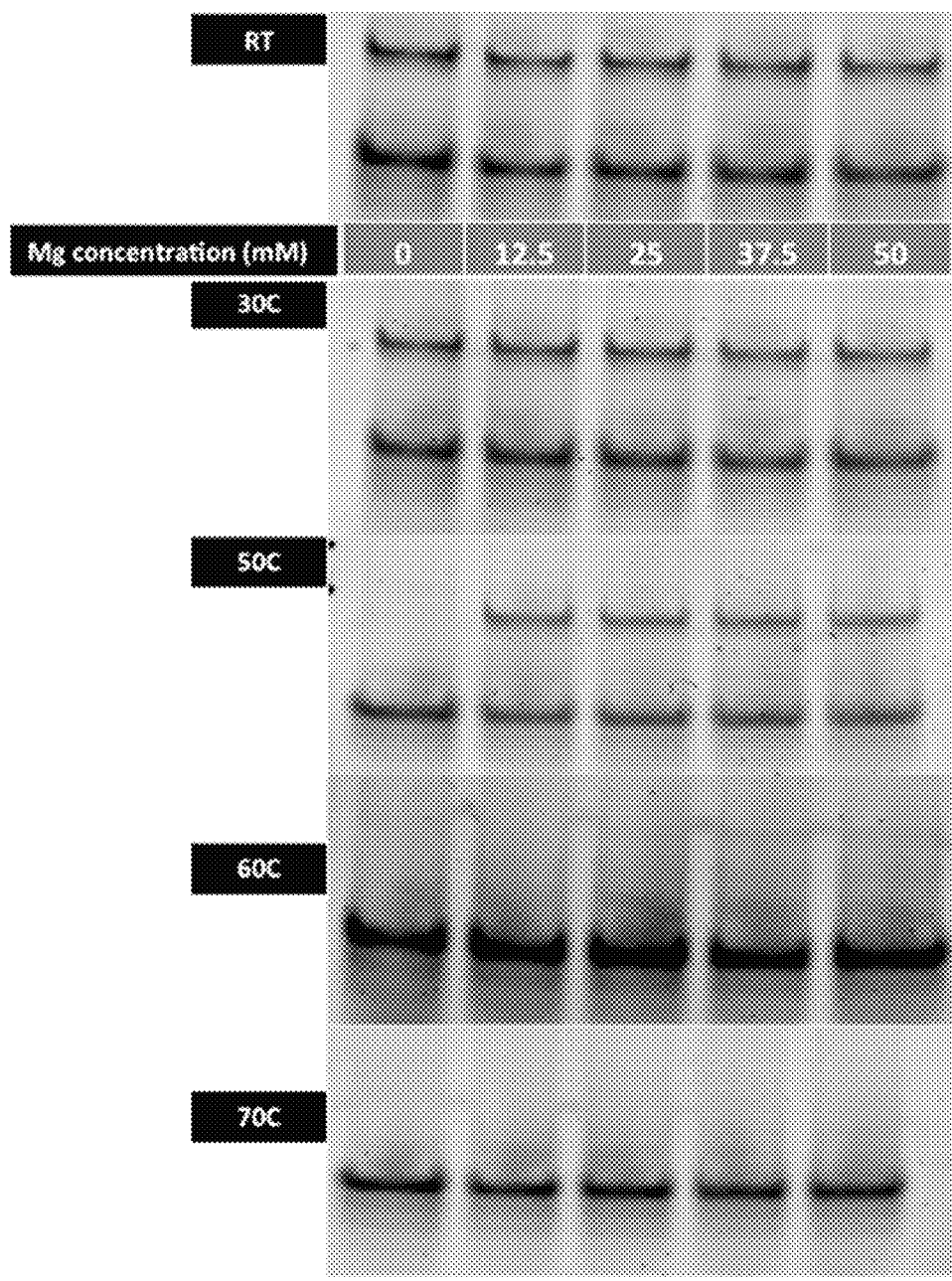
FIG. 29 shows gel electrophorese of various samples of DNA sensors.

The same DNA structure and system shown in FIGS. 19A-19B is used to detect the solution's ionization strength, which is crucial to oil well application. Mentioned in previous section, the appearance and disappearance of top band of dimer is highly correlated with the concentration of magnesium salt used. The experimental setup allows the salt to be added after the DNA sensors experience the temperature. At lab bench, the variation of salt concentrations is added. Shown in FIG. 29, the same DNA sensor was applied to incubate at different temperatures from room temperature, 30° C., 50° C., 60° C., to 70° C. After the incubation, the samples were treated with the magnesium salts in different concentrations from 0, 2.5 mM, 5 mM, 12.5 mM, to 25 mM. In theory, the neutral balance salt concentration is 12.5 mM, and this design allows checking below and above this neutral balance. Promising evidence was shown in FIGS. 26A-26B to indicate the system can be a good ionization detector as well as a thermal sensor. Each particle is responsible for one temperature. With multiple particles on site, a collection of them can provide information about a specific temperature after analyzing the distributions of structures from various DNAs. The $CaCO_3$ microparticles will travel into oil underground, and come out from the production well for the extended reach well shown. The microparticles will be collected applying a magnetic field on the magnetite microparticles. DNA samples are released by EDTA and purified for the further analysis. FIG. 26B shows the specific design of DNA 1, which is a hairpin structure, and the red color shows as the neck of the hairpin and green shows as the head group of the hairpin. DNA 1a or DNA 2 is another hairpin in the same microparticle, which is served to bind with DNA 1 when it straightens and prevent DNA 1 to fold back to be a hairpin when the temperature cools back. The pair of DNA is responsible for one specific temperature. Both RT and 30° C. samples showed the appearance of the dimer structure regardless the magnesium concentration used. At 50° C., no dimer structure was found in 0 mM concentration of Mg. At 60° C., the dimer structure was found in 12.5 mM and 25 mM only. At 70° C., the dimer structure completely disappears regardless of the salt concentration. Hence, the patterns of the matrix of Mg concentration and temperature provides data and evidence to indicate either a specific temperature or salt concentration when one variable is given.

Other Materials.

A. Mesoporous Silica Nanoparticles.

Figure 30A:
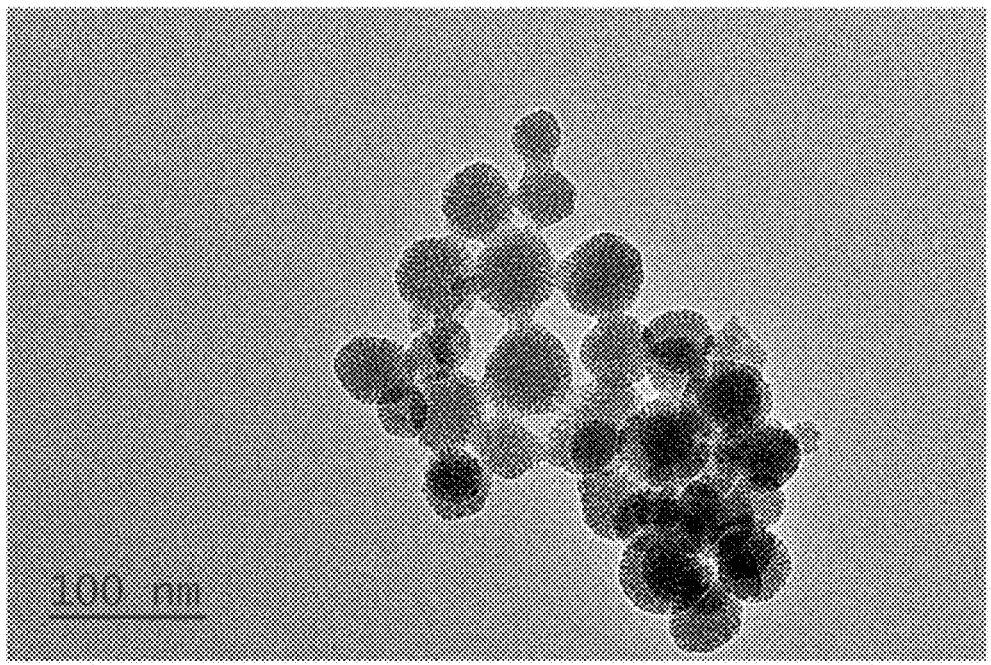
FIGS. 30A-30B show TEM images of the as synthesized mesoporous silica nanoparticles (FIG. 30A) and after staying in brine solution for two weeks for stability test (FIG. 30B).
Figure 30B:
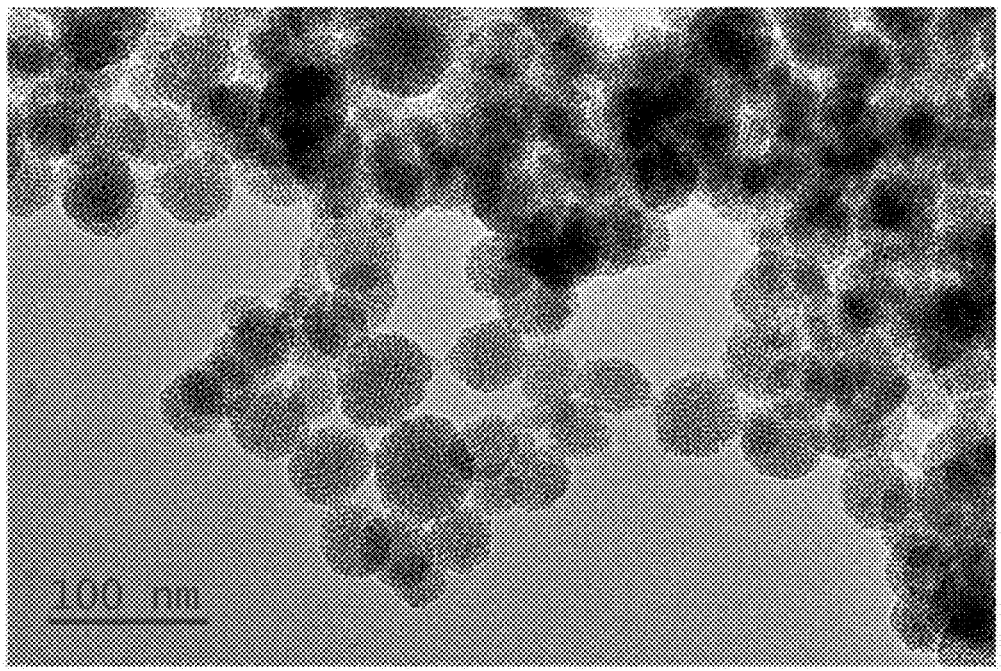

For better the buoyancy of the nanosensor carriers, other materials were also considered as the DNA nanosensor carriers, for example, mesoporous silica nanoparticles (MSNs). MSNs are environmentally friendly materials with the large load capacity, biocompatibility, high thermal stability and tunable pore structures. Functionalized MSNs have been used as carrier vehicles for drugs, genes, and biosensors. MSNs were successfully synthesized with much smaller size than the calcium carbonate synthesized before, and with the porous structure, it was expected that the buoyancy of MSNs is better than that of the calcium carbonate. The sizes of the silica particles were mainly 50-80 nm, as shown in the TEM image of FIG. 30A-30B, and the porous structures can be seen on the TEM images of FIGS. 30A-30B as well. The stability of the mesoporous nanoparticles was tested in brine solution for two weeks, which has high salinity and used for oil recovery process. The particles seem very stable in brine solution, as the image in FIG. 30B has identical size, structure, and shape with the left image.

B. Magnetic Particles.

Figure 31:
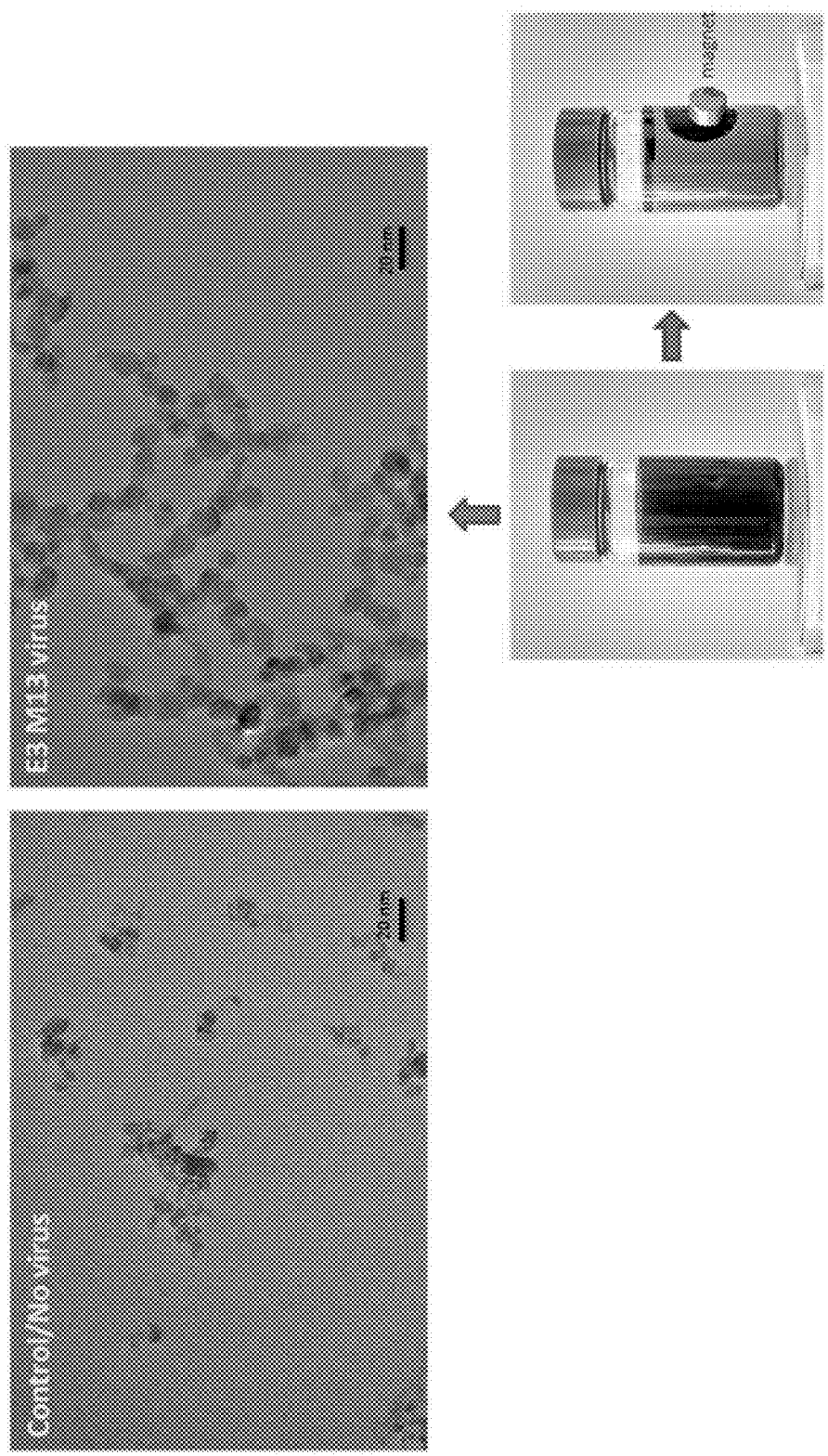
FIG. 31 shows TEM image of the iron oxide nanoparticles synthesized without virus (left), and with virus (right). The bottom photos show the magnetic property.
Figure 32:
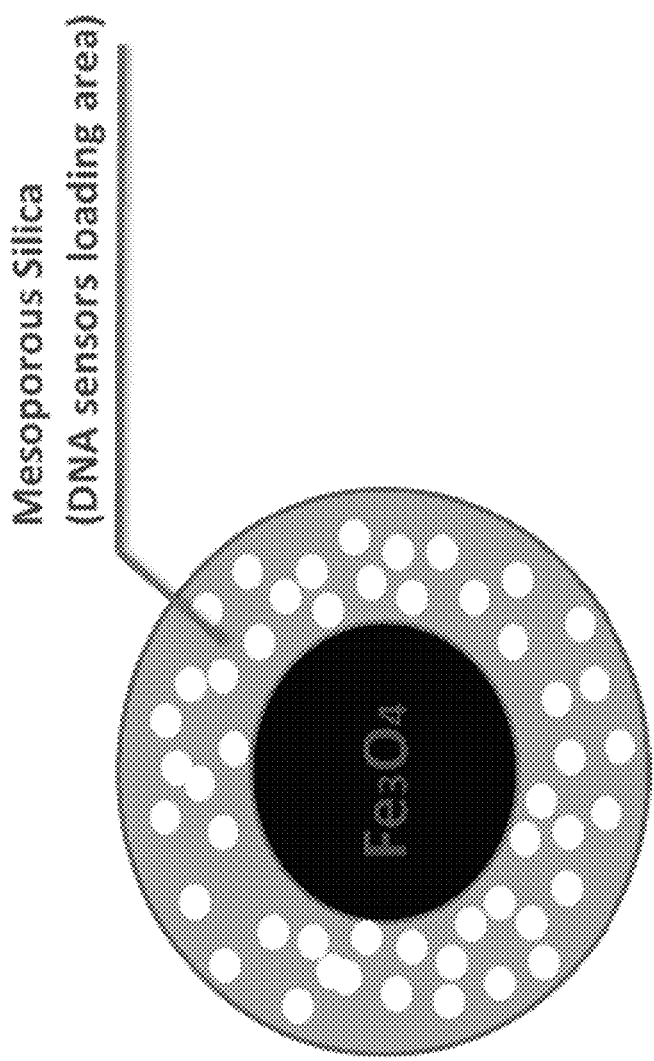
FIG. 32 shows iron oxide/silica particles design as a protector and carrier for DNA sensors.

Magnetic materials, for example, iron oxide ($Fe_3O_4$), are desired as a part of the nanosensor carriers for the EOR application, for easy collection purpose. However, uniform sized iron oxide with good magnetic property is difficult to synthesize under the mild conditions. The synthesis normally requires a very high temperature and organic solvents. Iron oxide was synthesized using M13 virus as a template in aqueous solution under the room temperature. As shown by FIG. 31, the size of the iron oxide is large with uniform shape. The particles also showed good magnetic property.

Based on the silica and iron oxide synthesis technique developed, a DNA sensor carrier can be built with iron oxide in the center and covered by the porous silica to load the DNA sensor. The size of the carrier can be 200-800 nm, and DNA sensors can be loaded by physical absorption or chemical reaction. This carrier can be light, buoyant, and magnetic for easy delivery and collection.

Other embodiments are within the scope of the following claims.

What is claimed is:

1. A composition comprising:
   a nanoparticle or microparticle comprising
   a core including one or more surfactants; and
   an outer layer encapsulating the core, wherein the outer layer includes an inorganic material including silica and the surfactant in the core is releasable at controlled conditions.

2. The composition of claim 1, wherein the core has a micelle structure.

3. The composition of claim 1, wherein the inorganic material includes calcium carbonate.

4. The composition of claim 1, wherein the core includes oleic acid.

5. The composition of claim 1, wherein the one or more surfactants include an anionic surfactant.

6. The composition of claim 5, wherein the anionic surfactant is sodium dodecyl sulfate (SDS).

7. The composition of claim 1, wherein the one or more surfactants include a cationic surfactant.

8. The composition of claim 7, wherein the cationic surfactant is cetyl trimethylammonium bromide.

9. The composition of claim 1, wherein the core further comprises a DNA.

10. The composition of claim 9, wherein the DNA forms a hairpin structure, an A-motif structure, or an I-motif structure.

11. The composition of claim 9, wherein the DNA includes a monomer, a dimer, or a combination thereof.

12. The composition of claim 1, wherein the core further comprises a magnetic material.

13. The composition of claim 12, wherein the magnetic material is ferrofluid.

14. The composition of claim 1, wherein the core includes an upconverting nanoparticle.

15. The composition of claim 1, wherein a thickness of the outer layer is between 10 nm and 20 nm.

16. The composition of claim 1, wherein the surfactant is released from the outer layer at pH 3.0 or below.

17. A sensor comprising the composition of claim 1.

18. A sensor carrier comprising:
   a core including a magnetic material; and
   an outer layer encapsulating the core, wherein the outer layer including a plurality of the composition of claim 1.

19. A method of making a composition comprising:
   preparing one or more surfactants;
   forming a core including the one or more surfactants; and encapsulating the core with an inorganic material including silica wherein the surfactant in the core is releasable at controlled conditions.

* * * * *